United States Patent
Adachi et al.

(10) Patent No.: US 10,597,013 B2
(45) Date of Patent: Mar. 24, 2020

(54) DRIVING ASSIST DEVICE AND DRIVING ASSIST METHOD

(71) Applicant: TOYOTA JIDOSHA KABUSHIKI KAISHA, Toyota-shi, Aichi-ken (JP)

(72) Inventors: Masahiko Adachi, Susono (JP); Kohei Tochigi, Susono (JP); Shin Tanaka, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 42 days.

(21) Appl. No.: 16/007,030

(22) Filed: Jun. 13, 2018

(65) Prior Publication Data

US 2019/0031163 A1 Jan. 31, 2019

(30) Foreign Application Priority Data

Jul. 31, 2017 (JP) ................................ 2017-147918

(51) Int. Cl.
| | | |
|---|---|---|
| *B60T 8/32* | (2006.01) | |
| *B60T 8/17* | (2006.01) | |
| *B60T 7/22* | (2006.01) | |
| *B60W 30/14* | (2006.01) | |
| *B60W 50/00* | (2006.01) | |

(Continued)

(52) U.S. Cl.
CPC ............. *B60T 8/3275* (2013.01); *B60T 7/22* (2013.01); *B60T 8/17* (2013.01); *B60W 30/143* (2013.01); *B60W 50/0097* (2013.01); *G06K 9/00818* (2013.01); *B60T 2210/32* (2013.01); *B60W 30/16* (2013.01); *B60W 2540/12* (2013.01); *B60W 2550/22* (2013.01); *B60W 2720/106* (2013.01)

(58) Field of Classification Search
CPC ............. B60T 8/3275; B60T 7/22; B60T 8/17
See application file for complete search history.

(56) References Cited

U.S. PATENT DOCUMENTS

| | | | |
|---|---|---|---|
| 2010/0082252 A1* | 4/2010 | Asanuma ............... | G08G 1/005 701/301 |
| 2014/0343750 A1 | 11/2014 | Minemura et al. | |

(Continued)

FOREIGN PATENT DOCUMENTS

| | | |
|---|---|---|
| JP | 2005-063398 A | 3/2005 |
| JP | 2013-196639 A | 9/2013 |

(Continued)

*Primary Examiner* — Adam M Alharbi
(74) *Attorney, Agent, or Firm* — Sughrue Mion, PLLC

(57) ABSTRACT

In a driving assist device, an electronic control unit is configured to determine whether a target position is able to be decided from a predetermined object indicating that a vehicle needs to be decelerated, when recognizing the predetermined object, to perform a first assist by which the vehicle is decelerated at a first deceleration that is changed based on a brake operation by a driver, when determining that the target position is not able to be decided, and to perform a second assist by which the vehicle is decelerated at a second deceleration that is equal to or higher than a predetermined deceleration necessary to decelerate the vehicle to the target velocity before the vehicle reaches the target position decided from the predetermined object, when determining that the target position is able to be decided.

9 Claims, 11 Drawing Sheets

(51) Int. Cl.
  *G06K 9/00* (2006.01)
  *B60W 30/16* (2020.01)

(56) References Cited

U.S. PATENT DOCUMENTS

| | | | |
|---|---|---|---|
| 2015/0291216 A1* | 10/2015 | Sato | B60W 30/08 701/23 |
| 2017/0297547 A1 | 10/2017 | Goto et al. | |

FOREIGN PATENT DOCUMENTS

| | | |
|---|---|---|
| JP | 2014-222462 A | 11/2014 |
| JP | 2016-122362 A | 7/2016 |
| WO | 2016/158508 A1 | 10/2016 |

\* cited by examiner

DRIVING ASSIST DEVICE AND DRIVING ASSIST METHOD

INCORPORATION BY REFERENCE

The disclosure of Japanese Patent Application No. 2017-147918 filed on Jul. 31, 2017 including the specification, drawings and abstract is incorporated herein by reference in its entirety.

BACKGROUND

1. Technical Field

The disclosure relates to a technical field of a driving assist device and a driving assist method that performs a deceleration assist by which a vehicle is decelerated to a target velocity before the vehicle reaches a target position.

2. Description of Related Art

An example of the driving assist device is described in Japanese Patent Application Publication No. 2005-063398 (JP 2005-063398 A). Specifically, the driving assist device described in JP 2005-063398 A performs a deceleration assist of extracting a road sign requiring a stop and a stop line from an image that is photographed by a camera and that shows a view in front of the vehicle, calculating a stop position (that is, a target position) based on one of the extracted road sign and stop line, and intervening in driving of the vehicle so as to stop the vehicle at the calculated target position.

In addition, there is Japanese Patent Application Publication No. 2013-196639 (JP 2013-196639 A), as a literature in the related art relevant to the disclosure.

SUMMARY

There is a possibility that a driver operates a brake pedal while the deceleration assist is being performed, that is, while the driving assist device is intervening in the driving of the vehicle. However, in the driving assist device described in JP 2005-063398 A, a cooperation of the deceleration assist and the brake operation is not considered. Therefore, the driving assist device described in JP 2005-063398 A has room for improvement, in that it is necessary to perform the cooperation with the deceleration assist by the driving assist device and the brake operation by the driver.

The disclosure provides a driving assist device and a driving assist method able to perform a deceleration assist by which the vehicle is decelerated to the target velocity before the vehicle reaches the target position, while cooperating with the brake operation by the driver.

A first aspect of the disclosure is a driving assist device that includes an electronic control unit. The electronic control unit is configured to perform a deceleration assist by which a vehicle is decelerated to a target velocity before the vehicle reaches the target position. The electronic control unit is configured to recognize a situation in front of the vehicle. The electronic control unit is configured to determine whether the target position is able to be decided from a predetermined object, when the electronic control unit recognizes that the predetermined object exist in front of the vehicle. The predetermined object indicates that the vehicle needs to be decelerated. The electronic control unit is configured to perform a first assist as the deceleration assist when the electronic control unit determines that the target position is not able to be decided. The first assist is an assist by which the vehicle is decelerated at a first deceleration. The first deceleration is changed based on a brake operation by a driver. The electronic control unit is configured to perform a second assist as the deceleration assist when the electronic control unit determines that the target position is able to be decided. The second assist is an assist by which the vehicle is decelerated at a second deceleration. The second deceleration is equal to or higher than a predetermined deceleration necessary to decelerate the vehicle to the target velocity before the vehicle reaches the target position decided from the predetermined object.

When the target position is not able to be decided, there is a relatively higher possibility that a position where decelerating of the vehicle is completed deviates from a proper target position due to an active intervention in the driving of the vehicle by the deceleration assist, compared to when the target position is able to be decided. Therefore, when the target position is not able to be decided, the driving assist device performs, as the deceleration assist, the first assist by which the vehicle is decelerated at the first deceleration depending on the brake operation by the driver. That is, the brake operation by the driver has priority over the active intervention in the driving of the vehicle by the deceleration assist, and typically, the intervention in the driving of the vehicle by the deceleration assist is not performed, or is suppressed to a bare minimum. On the other hand, when the target position is able to be decided, there is a relatively lower possibility that the position where the decelerating of the vehicle is completed deviates from the proper target position due to the active intervention in the driving of the vehicle by the deceleration assist. Therefore, when the target position is able to be decided, the driving assist device performs, as the deceleration assist, the second assist by which the vehicle is decelerated at the second deceleration allowing the vehicle to be surely decelerated to the target velocity before the vehicle reaches the target position. That is, the active intervention in the driving of the vehicle by the deceleration assist has priority over the brake operation by the driver. Thus, depending on whether the target position is decided, the driving assist device performs switching between the first assist in which the brake operation has priority over the active intervention in the driving of the vehicle by the deceleration assist and the second assist in which the active intervention in the driving of the vehicle by the deceleration assist has priority over the brake operation. Therefore, the driving assist device can appropriately perform the deceleration assist by which the vehicle is decelerated to the target velocity before the vehicle reaches the target position, while cooperating with the brake operation by the driver.

Even when the target position is not able to be decided, assist means may perform, as the deceleration assist, a third assist that is different from the first assist and by which the vehicle is decelerated without being based on the brake operation by the driver, when the brake operation is not performed by the driver. For example, the third assist may be a deceleration assist by which the vehicle is decelerated to the target velocity before the vehicle reaches the target position provisionally set based on the predetermined object. Alternatively, for example, the third assist may be a deceleration assist by which the vehicle is decelerated at a desired deceleration.

In the driving assist device, an initial value of the first deceleration may be the sum of a deceleration that is demanded by the brake operation at a time point of start of the brake operation and a deceleration that is generated in the vehicle at the time point of the start due to the deceleration assist.

In the case where the vehicle is already decelerated by the deceleration assist at the time point of the start of the brake operation (that is, in the case where the vehicle is being decelerating), there is a possibility that the deceleration of the vehicle is discontinuously changed, when the vehicle starts to be decelerated at the first deceleration coinciding with the deceleration that is demanded by the brake operation at the start of the brake operation. As a result, for example, there is a possibility that the driver having performed the brake operation feels a shortage of the deceleration and the like (that is, the driver has an uncomfortable feeling). In the driving assist device, the vehicle starts to be decelerated at the first deceleration coinciding with the sum of the deceleration that is demanded by the brake operation at the start of the brake operation and the deceleration already generated due to the deceleration assist. Accordingly, the driver does not have an uncomfortable feeling.

On the other hand, in the case where the vehicle is not decelerated by the deceleration assist at the time point of the start of the brake operation (that is, in the case where the vehicle is not being decelerated), the deceleration that is generated in the vehicle at the time point of the start of the brake operation due to the deceleration assist is zero. That is, the initial value of the first deceleration coincides with the deceleration that is demanded by the brake operation. In other words, the vehicle starts to be decelerated at the first deceleration coinciding with the deceleration that is demanded by the brake operation at the start of the brake operation. However, even when the vehicle starts to be decelerated at the first deceleration, the driver does not have an uncomfortable feeling, because the vehicle is not decelerated by the deceleration assist at the time point of the start of the brake operation.

In the driving assist device, the second deceleration at a predetermined time point in a period in which the second assist is performed may be a larger one of the predetermined deceleration at the predetermined time point, and the sum of a deceleration that is demanded by the brake operation at the predetermined time point and a deceleration that is generated in the vehicle at a time point of start of the brake operation due to the deceleration assist.

The driving assist device performs the second assist by which the vehicle is decelerated at the second deceleration that is surely equal to or larger than the predetermined deceleration, and therefore, can appropriately decelerate the vehicle to the target velocity before the vehicle reaches the target position.

In the driving assist device, the electronic control unit may be configured to determine that the target position is able to be decided, when the electronic control unit recognizes a position where decelerating of the vehicle is required to be completed and recognize a first object as the predetermined object. The first object may indicate that the vehicle needs to be decelerated. The electronic control unit may be configured to determine that the target position is not able to be decided, when the electronic control unit recognizes a second object as the predetermined object and does not recognize the first object as the predetermined object. The second object is different from the first object.

In the driving assist device, it is possible to appropriately determine whether the target position is able to be decided.

In the driving assist device, the electronic control unit may be configured to determine whether the recognized predetermined object has a first reliability, based on a recognition result of the predetermined object. The first reliability may be a reliability that the predetermined object certainly indicates that the vehicle needs to be decelerated. The electronic control unit may be configured to perform the first assist as the deceleration assist, when the electronic control unit determines that the target position is able to be decided and determines that the predetermined object does not have the first reliability. The electronic control unit may be configured to perform the second assist as the deceleration assist, when the electronic control unit determines that the target position is able to be decided and determines that the predetermined object has the first reliability.

When the predetermined object does not have the first reliability, there is a possibility that the target position supposed to be decided deviates from a proper target position, compared to when the predetermined object has the first reliability. As a result, there is a relatively higher possibility that the position where the decelerating of the vehicle is completed deviates from the proper target position due to the active intervention in the driving of the vehicle by the deceleration assist. Therefore, even when the target position is able to be decided, the driving assist device performs, as the deceleration assist, the first assist by which the vehicle is decelerated at the first deceleration depending on the brake operation by the driver, when the predetermined object does not have the first reliability. Thus, the driving assist device performs the switching between the first assist in which the brake operation has priority and the second assist in which the active intervention in the driving of the vehicle by the deceleration assist has priority, depending on the reliability of the predetermined object recognized by recognition means in addition to the result of the determination of whether the target position is able to be decided. Therefore, the driving assist device can more appropriately perform the deceleration assist by which the vehicle is decelerated to the target velocity before the vehicle reaches the target position, while cooperating with the brake operation by the driver.

In the driving assist device, the predetermined object may include a first object indicating a position where decelerating of the vehicle is required to be completed. The electronic control unit may be configured to determine whether the first object recognized as the predetermined object has a second reliability, based on a recognition result of the predetermined object. The second reliability is a reliability that the first object appropriately indicates the position where the decelerating of the vehicle is required to be completed. The electronic control unit may be configured to perform the first assist as the deceleration assist, when the electronic control unit determines that the target position is able to be decided and determines that the first object does not have the second reliability. The electronic control unit may be configured to perform the second assist as the deceleration assist, when the electronic control unit determines that the target position is able to be decided and determines that the first object has the second reliability.

When the first object does not have the second reliability, there is a possibility that the target position supposed to be decided deviates from the proper target position, compared to when the first object has the second reliability. As a result, there is a relatively higher possibility that the position where the decelerating of the vehicle is completed deviates from the proper target position due to the active intervention in the driving of the vehicle by the deceleration assist. Therefore, even when the target position is able to be decided, the driving assist device performs, as the deceleration assist, the first assist by which the vehicle is decelerated at the first deceleration depending on the brake operation by the driver, when the first object does not have the second reliability. Thus, the driving assist device performs the switching between the first assist in which the brake operation has priority and the second assist in which the active intervention in the driving of the vehicle by the deceleration assist has priority, depending on the reliability of the first object recognized by the recognition means in addition to the result of the determination of whether the target position is able to be decided. Therefore, the driving assist device can more appropriately perform the deceleration assist by which the vehicle is decelerated to the target velocity before the vehicle reaches the target position, while cooperating with the brake operation by the driver.

In the driving assist device, the electronic control unit may be configured to determine whether at least one of a delay and a shortage of an actual brake operation has occurred relative to a virtual brake operation necessary to decelerate the vehicle to the target velocity before the vehicle reaches the target position. The electronic control unit may be configured to perform the first assist as the deceleration assist, when the electronic control unit determines that the target position is able to be decided and determines that neither of the delay and the shortage of the actual brake operation has occurred. The electronic control unit may be configured to perform the second assist as the deceleration assist, when the electronic control unit determines that the target position is able to be decided and determines that the at least one of the delay and the shortage of the actual brake operation has occurred.

When the delay and shortage of the actual brake operation have not occurred, it is expected that the vehicle can be decelerated to the target velocity before the vehicle reaches the target position by the brake operation without the active intervention in the driving of the vehicle by the deceleration assist. Hence, when the delay and shortage of the actual brake operation have not occurred, the driving assist device performs, as the deceleration assist, the first assist by which the vehicle is decelerated at the first deceleration depending on the brake operation by the driver, even when the target position is able to be decided. Thus, the driving assist device can perform the switching between the first assist in which the brake operation has priority and the second assist in which the active intervention in the driving of the vehicle by the deceleration assist has priority, depending on whether the delay or shortage of the actual brake operation has occurred in addition to the result of the determination of whether the target position is able to be decided. Therefore, the driving assist device can more appropriately perform the deceleration assist by which the vehicle is decelerated to the target velocity before the vehicle reaches the target position, while cooperating with the brake operation by the driver.

In the driving assist device, the vehicle may include a detector configured to detect the situation in front of the vehicle. The electronic control unit may be configured to recognize the situation in front of the vehicle based on a detection result of the detector.

A second aspect of the disclosure is a driving assist method for a vehicle. The vehicle includes an electronic control unit and a detector. The electronic control unit is configured to perform a deceleration assist by which a vehicle is decelerated to a target velocity before the vehicle reaches a target position. The detector is configured to detect a situation in front of the vehicle. The driving assist method includes: recognizing the situation in front of the vehicle based on a detection result of the detector; determining whether the target position is able to be decided from a predetermined object, when the electronic control unit recognizes that the predetermined object exists in front of the vehicle, the predetermined object indicating that the vehicle needs to be decelerated; performing a first assist as the deceleration assist when the electronic control unit determines that the target position is not able to be decided, the first assist being an assist by which the vehicle is decelerated at a first deceleration, the first deceleration being changed based on a brake operation by a driver; and performing a second assist as the deceleration assist when the electronic control unit determines that the target position is able to be decided, the second assist being an assist by which the vehicle is decelerated at a second deceleration, the second deceleration being equal to or higher than a predetermined deceleration necessary to decelerate the vehicle to the target velocity before the vehicle reaches the target position decided from the predetermined object.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment of a driving assist device will be described with reference to the drawings. Hereinafter, the description will be made with use of a vehicle 1 equipped with the embodiment of the driving assist device.

Configuration of Vehicle 1

Figure 1:
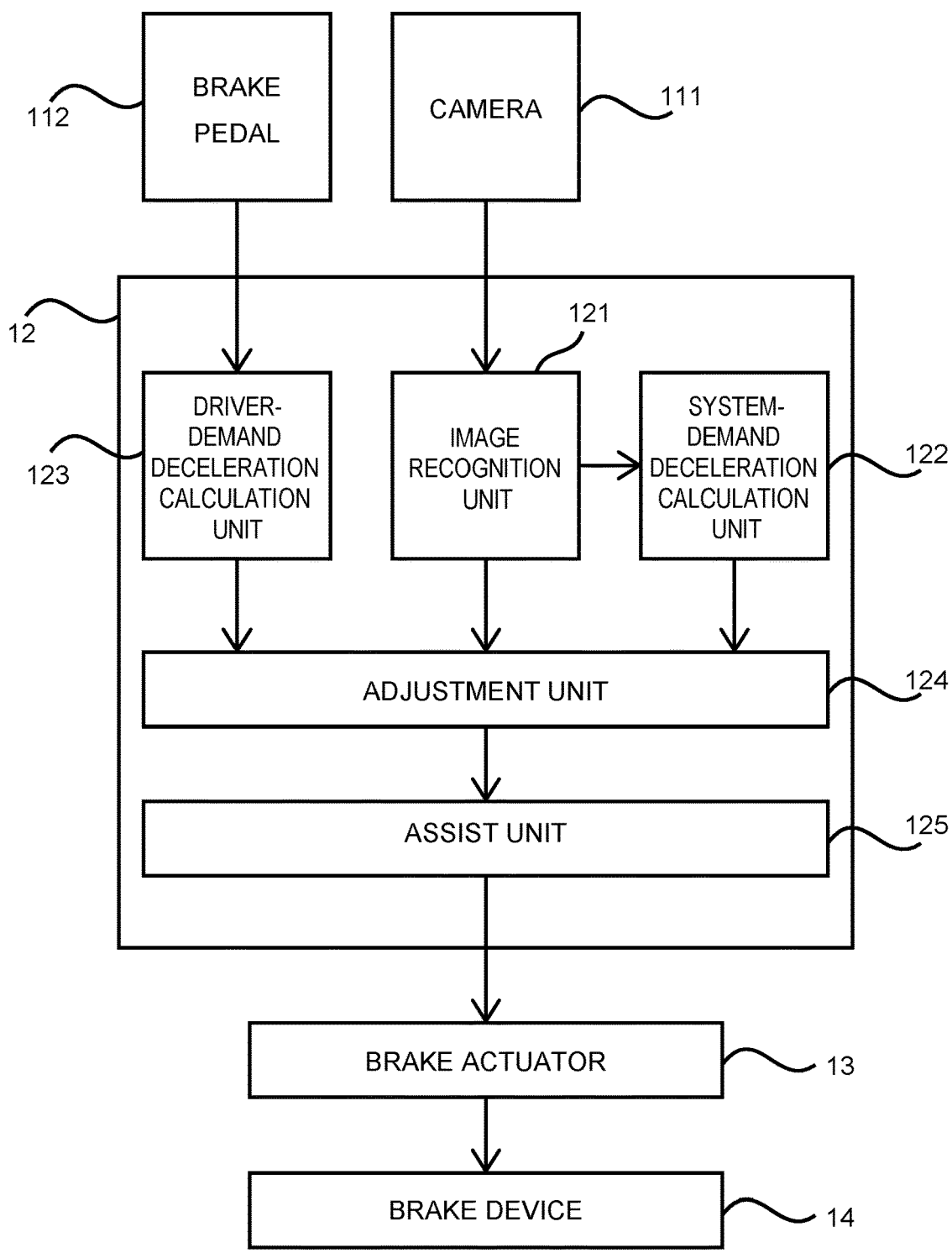
FIG. 1 is a block diagram showing a configuration of a vehicle in an embodiment.

First, a configuration of the vehicle 1 in the embodiment will be described with reference to FIG. 1. FIG. 1 is a block diagram showing the configuration of the vehicle 1 in the embodiment.

As shown in FIG. 1, the vehicle 1 includes a camera 111, a brake pedal 112, a brake actuator 13, a brake device 14, and an electronic control unit (ECU) 12 that is a specific example of a "driving assist device".

The camera 111 is an example of the detector, and is an image capturing device that captures a view in front of the vehicle 1. An image captured by the camera 111 (that is, an image showing a situation in front of the vehicle 1) is output from the camera 111 to the ECU 12.

The brake pedal 112 is an operation pedal that is operated by a driver for braking the vehicle 1. An operation signal indicating the content of the operation of the brake pedal 112 is input to the ECU 12.

The ECU 12 controls a behavior of the whole of the vehicle 1. In the embodiment, particularly, the ECU 12 performs a deceleration assist by which the vehicle 1 is decelerated to a target velocity before the vehicle 1 reaches a target position. In the deceleration assist, when the target velocity is set to zero, the deceleration assist by which the vehicle 1 is decelerated to the target velocity before the vehicle 1 reaches the target position is substantially equivalent to a stop assist by which the vehicle 1 is stopped at the target position. Therefore, in the embodiment, the "deceleration assist" includes the "stop assist".

For performing the deceleration assist, the ECU 12 includes an image recognition unit 121, a system-demand deceleration calculation unit 122 (hereinafter, for convenience of description, referred to as merely a "deceleration calculation unit 122"), a driver-demand deceleration calculation unit 123 (hereinafter, for convenience of description, referred to as merely a "deceleration calculation unit 123"), an adjustment unit 124, and an assist unit 125, as processing blocks that are logically realized within the ECU 12. Each behavior of the image recognition unit 121, the deceleration calculation unit 122, the deceleration calculation unit 123, the adjustment unit 124 and the assist unit 125 will be described in detail (see FIG. 2 and the like). The outline will be briefly described here. The image recognition unit 121 recognizes a predetermined deceleration target indicating that the vehicle 1 needs to be decelerated, from the image captured by the camera 111. The deceleration target is a specific example of each of the "predetermined object" and the "second object". The deceleration calculation unit 122 sets the target position based on the deceleration target recognized by the image recognition unit 121, and calculates a deceleration (hereinafter, referred to as a "system-demand deceleration") Ds necessary to decelerate the vehicle 1 to the target velocity before the vehicle 1 reaches the target position. The deceleration calculation unit 123 calculates a deceleration (hereinafter, referred to as a "driver-demand deceleration") Dd that is demanded by the driver who operates the brake pedal 112, based on the content of the operation of the brake pedal 112. The adjustment unit 124 sets a target value (hereinafter, referred to as a "target deceleration" when appropriate) D_target of the deceleration of the vehicle 1 when the vehicle 1 is decelerated by the deceleration assist, based on at least one of the system-demand deceleration Ds calculated by the deceleration calculation unit 122 and the driver-demand deceleration Dd calculated by the deceleration calculation unit 123. The assist unit 125 controls the brake actuator 13 such that the vehicle 1 is decelerated at the target deceleration D_target set by the adjustment unit 124.

Under the control by the assist unit 125, the brake actuator 13 controls a brake device 14 that can brake unillustrated wheels, so as to give braking power to the vehicle 1. As a result, the vehicle 1 is decelerated by the deceleration assist that is performed by the assist unit 125. In consequence, the vehicle 1 is decelerated to the target velocity before the vehicle 1 reaches the target position, without requiring the operation of the brake pedal 112 by the driver. Alternatively, the operation of the brake pedal 112 by the driver is assisted, in order to decelerate the vehicle 1 to the target velocity before the vehicle 1 reaches the target position.

Deceleration Assist To Be Performed by ECU 12

Subsequently, the content of the deceleration assist to be performed by the ECU 12 will be described.

Flow of Deceleration Assist

Figure 2:
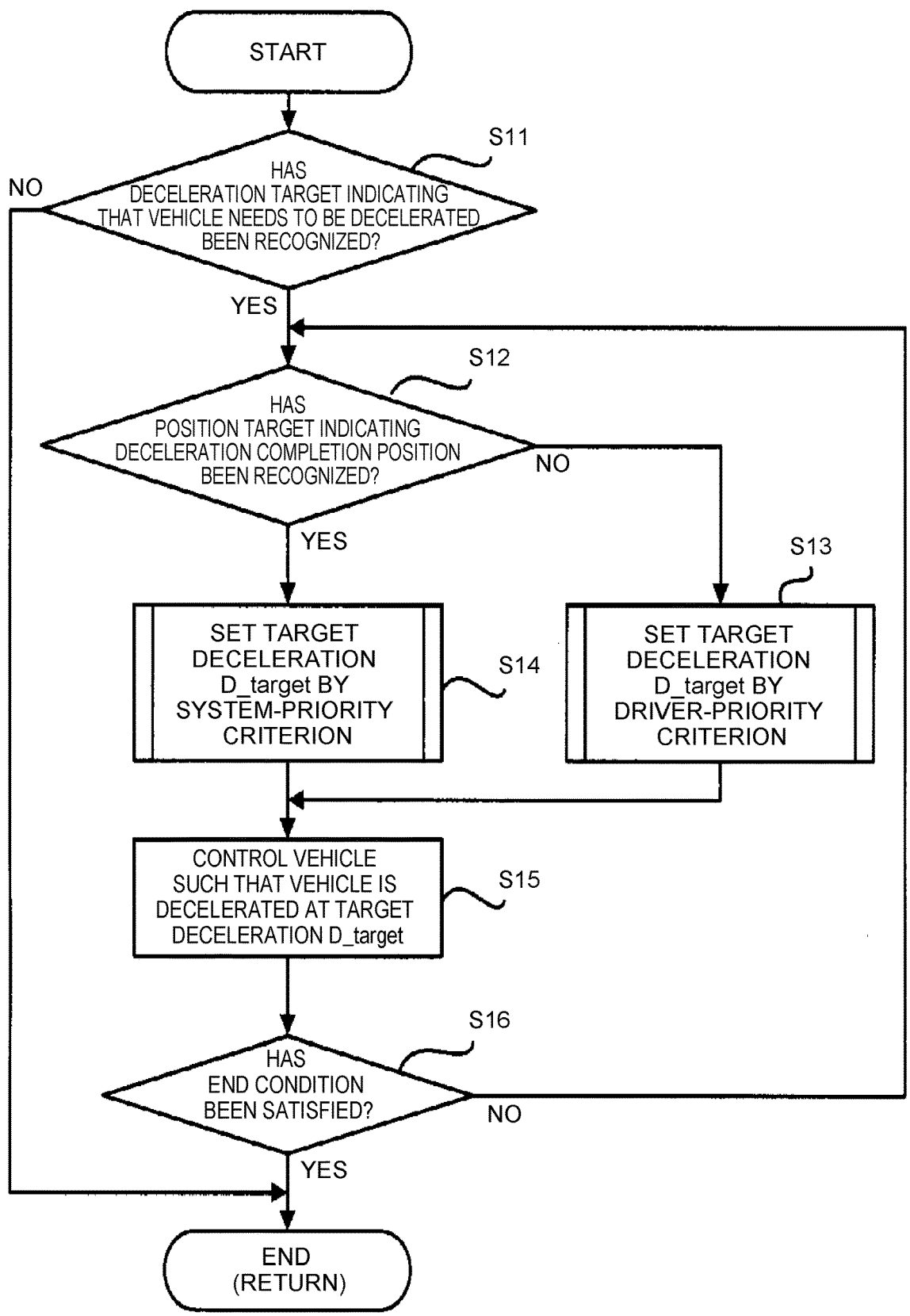
FIG. 2 is a flowchart showing a flow of a deceleration assist.

The content of the deceleration assist to be performed by the ECU 12 will be described with reference to FIG. 2. FIG. 2 is a flowchart showing a flow of the deceleration assist to be performed by the ECU 12.

As shown in FIG. 2, first, the adjustment unit 124 determines whether the image recognition unit 121 has recognized the predetermined deceleration target indicating that the vehicle 1 needs to be decelerated (in other words, suggesting that the vehicle 1 needs to be decelerated, directly, indirectly or implicitly) in the image captured by the camera 111 (step S11). The camera 111 continues to photograph the view in front of the vehicle 1, while the deceleration assist shown in FIG. 2 is being performed. Therefore, the image recognition unit 121 continues to execute the process of detecting the deceleration target in the image captured by the camera 111, while the deceleration assist shown in FIG. 2 is being performed.

As described above, in the embodiment, the deceleration assist includes the stop assist. Therefore, the deceleration target includes not only a target indicating that the vehicle 1 needs to be decelerated but also a target indicating that the vehicle 1 needs to be stopped. As an example of the deceleration target, there is at least one of a road sign (that is, a sign that is set on a road), a road mark (that is, a mark that is drawn on a road surface) and a traffic light that require or recommend the deceleration or stop of the vehicle based on laws. Examples of the road sign include a road sign that requires a stop (that is, a road sign that indicates a sign of "STOP"), a road sign that requires a slow travel, a road sign that indicates the existence of a pedestrian crossing, and a road sign that indicates the existence of a school. Examples of the road mark include a stop line that indicates a stop position, a road mark that indicates a no-stop area (for example, a position near a gateway of a police station or a fire station), a road mark that indicates a school zone, a road mark that indicates a pedestrian crossing or gives a notice that a pedestrian crossing exists ahead. As another example of the deceleration target, there is a physical object indicating that the vehicle 1 is desired to be decelerated or stopped for avoiding the collision between the vehicle 1 and the physical object although the physical object does not require or recommend the deceleration or stop of the vehicle 1 based on laws. Examples of the physical object include a forward vehicle that travels in front of the vehicle 1, another vehicle that is parked or stopped on a road in front of the vehicle 1, an obstacle that is on a road in front of the vehicle 1, and a structure that exists in front of the vehicle 1 (for example, a guardrail that exists in front of the vehicle 1 traveling toward a T-shaped intersection).

In the case where the adjustment unit 124 determines that the deceleration target has not been recognized as a result of the determination in step S11 (step S11: No), the ECU 12 ends the deceleration assist shown in FIG. 2. In the case where the ECU 12 ends the deceleration assist shown in FIG. 2, the ECU 12 starts the deceleration assist shown in FIG. 2 again after a predetermined period elapses.

On the other hand, in the case where the adjustment unit 124 determines that the deceleration target has been recognized as a result of the determination in step S11 (step S11: Yes), the adjustment unit 124 further determines whether the image recognition unit 121 has recognized a position target indicating a position where the decelerating of the vehicle 1 is required to be completed, in the image captured by the camera 111 (step S12). As described, in the embodiment, the deceleration assist includes the stop assist. Therefore, the position target includes not only a target indicating a position where the decelerating of the vehicle 1 is required to be completed but also a target indicating a position where the stop of the vehicle 1 is required to be completed (that is, a position where the vehicle 1 is required to be stopped). The position target is a specific example of each of the "predetermined object" and the "first object".

As an example of the position target, there is at least one of a road sign and a road mark that directly indicate a position where the vehicle 1 is required to be stopped or a position where the decelerating of the vehicle 1 is required to be completed in accordance with the determination by laws. Examples of the road sign include a road sign that is set just beside a stop line and that indicates the position of the stop line. Examples of the road mark include a stop line that indicates a stop position, a road mark that indicates a no-stop area, and a pedestrian crossing. As another example of the position target, there is a physical object that indirectly or implicitly indicates a position where the vehicle 1 is required to be stopped or a position where the decelerating of the vehicle 1 is required to be completed although the physical object does not directly indicate a position where the vehicle 1 is required to be stopped or a position where the decelerating of the vehicle 1 is required to be completed. Examples of the physical object include a forward vehicle that is stopped in front of the vehicle 1, another vehicle that is parked or stopped on a road in front of the vehicle 1, an obstacle that is on a road in front of the vehicle 1, and a structure that exists in front of the vehicle 1 (for example, a guardrail that exists in front of the vehicle 1 traveling toward a T-shaped intersection). This is because the vehicle 1 is required to be stopped or the decelerating of the vehicle 1 is required to be completed at a position behind the physical object for avoiding the collision with the physical object.

It can be said that the position target naturally indicates that the vehicle 1 needs to be decelerated because the position target indicates the position where the decelerating of the vehicle 1 is required to be completed. Therefore, the position target is included in the deceleration target. Accordingly, in the case where the adjustment unit 124 determines that the position target has been recognized as the deceleration target in step S11, the adjustment unit 124 determines that the position target has been recognized, also in the subsequent step S12. On the other hand, in the case where the adjustment unit 124 determines that a deceleration target other than the position target has been recognized in step S11, the adjustment unit 124 determines whether a particular position target associated with the deceleration target recognized in step S11 has been further recognized, in the subsequent step S12. The particular position target is a position target actually indicating a position where the decelerating of the vehicle 1 having recognized the deceleration target recognized in step S11 is required to be completed.

In the case where the adjustment unit 124 determines that the position target has not been recognized as a result of the determination in step S12 (step S12: No), the deceleration calculation unit 122 is not able to decide the target position. This is because the position target substantially indicating the target position has not been recognized yet. The deceleration calculation unit 122 is able to set a provisional target position based on the stop target or deceleration target recognized by the image recognition unit 121, but there is a possibility that the set provisional target position deviates from a proper definitive target position (that is, a position that is indicated by the position target and where the decelerating of the vehicle 1 is required to be completed). Accordingly, even when the assist unit 125 actively intervenes in driving of the vehicle 1 based on the provisional target position, there is a possible that the position where the decelerating of the vehicle 1 is completed deviates from the proper definitive target position due to the intervention.

Figure 3:
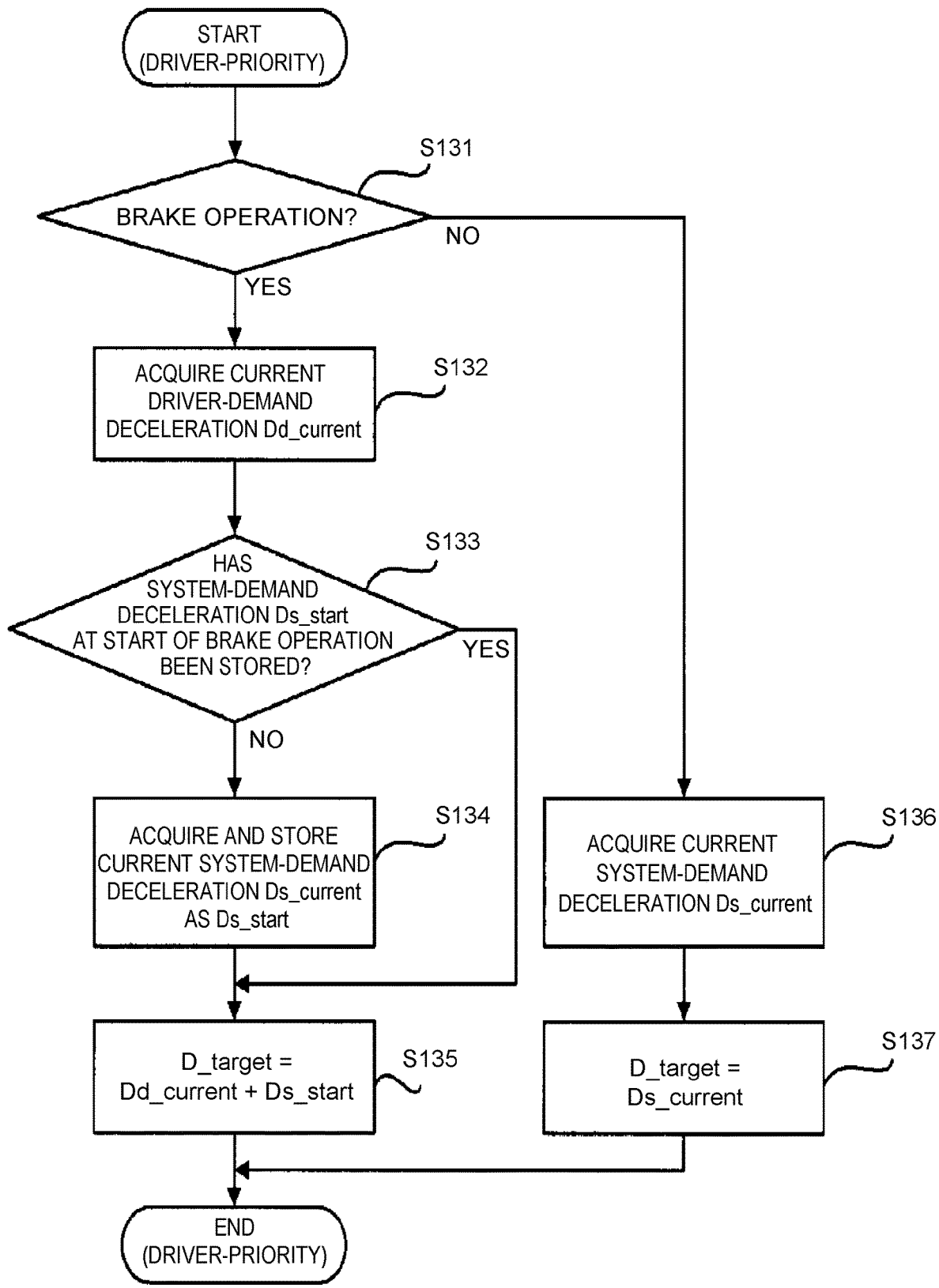
FIG. 3 is a flowchart showing a flow of a behavior for setting a target deceleration in accordance with a driver-priority criterion.

Hence, in the case where the deceleration calculation unit 122 is not able to decide the target position because the position target has not been recognized in this way, the adjustment unit 124 sets a target deceleration D_target, in accordance with a driver-priority criterion in which the operation (hereinafter, referred to as "brake operation") of the brake pedal 112 by the driver has priority over the active intervention in the driving of the vehicle 1 by the assist unit 125 (step S13). In the following, a behavior for setting the target deceleration D_target in accordance with the driver-priority criterion will be further described with reference to FIG. 3. FIG. 3 is a flowchart showing a flow of the behavior for setting the target deceleration D_target in accordance with the driver-priority criterion.

As shown in FIG. 3, the adjustment unit 124 determines whether the driver is operating the brake pedal 112 (step S131).

In the case where the adjustment unit 124 determines that the driver is not operating the brake pedal 112 as a result of the determination in step S131 (step S131: No), the adjustment unit 124 acquires a current system-demand deceleration Ds_current from the deceleration calculation unit 122 (step S136). The deceleration calculation unit 122 continues to execute a process of calculating the system-demand deceleration Ds, while the deceleration target (or the position target) is recognized. The current system-demand deceleration Ds_current is the last system-demand deceleration Ds calculated by the deceleration calculation unit 122 (that is, the latest system-demand deceleration Ds).

In the case where the target deceleration D_target is set in accordance with the driver-priority criterion, the target position has not been decided. In this case, the deceleration calculation unit 122 sets the provisional target position based on the deceleration target recognized in step S11 of FIG. 2. For example, the provisional target position may be set to a position where the deceleration target exists, may be set to a position that is shifted by a first predetermined amount from the position where the deceleration target exists to the far side (that is, the side that is distant from the vehicle 1), or may be set to a position that is shifted by a second predetermined amount from the position where the deceleration target exists to the near side (that is, the side that is close to the vehicle 1). Thereafter, the deceleration calculation unit 122 calculates a deceleration necessary to decelerate the vehicle 1 to the target velocity before the vehicle 1 reaches the provisional target position, as the system-demand deceleration Ds. Specifically, the deceleration calculation unit 122 calculates a distance d1 from the current position of the vehicle 1 to the provisional target position. Thereafter, the deceleration calculation unit 122 calculates the system-demand deceleration Ds, based on the calculated distance d1 and a current vehicle velocity V1 of the vehicle 1. For example, the assist unit 123 may calculate the system-demand deceleration Ds, using a formula Ds=V1$^2$/d1. Here, the deceleration calculation unit 122 may calculate the system-demand deceleration Ds without setting the provisional target position.

Thereafter, the adjustment unit 124 sets the current system-demand deceleration Ds_current acquired from the deceleration calculation unit 122 in step S136, as the target deceleration D_target (step S137).

On the other hand, in the case where the adjustment unit 124 determines that the driver is operating the brake pedal 112 as a result of the determination in step S131 (step S131: Yes), the adjustment unit 124 acquires a current driver-demand deceleration Dd_current from the deceleration calculation unit 123 (step S132). The deceleration calculation unit 123 continues to execute a process of calculating the driver-demand deceleration Dd, while the deceleration target (or the position target) is recognized. The current driver-demand deceleration Dd current is the last driver-demand deceleration Dd calculated by the deceleration calculation unit 123 (that is, the latest driver-demand deceleration Dd).

Thereafter, the adjustment unit 124 determines whether a system-demand deceleration Ds_start at the time point when the driver starts the operation of the brake pedal 112 has been stored (step S133).

In the case where the adjustment unit 124 determines that the system-demand deceleration Ds_start has not been stored as a result of the determination in step S133 (step S133: No), it is estimated that the driver first operated the brake pedal 112 at the time point when the adjustment unit 124 determined in step S131 that the driver was operating the brake pedal 112. That is, it is estimated that the driver started the operation of the brake pedal 112 at the time point when the adjustment unit 124 determined in step S131 that the driver was operating the brake pedal 112. In this case, the adjustment unit 124 acquires the current system-demand deceleration Ds_current (that is, the system-demand deceleration Ds at the time point when the driver started the operation of the brake pedal 112) from the deceleration calculation unit 122 (step S134). Furthermore, the adjustment unit 124 stores the acquired system-demand deceleration Ds_current as the system-demand deceleration Ds_start (step S134). In the case where the system-demand deceleration Ds_current acquired in step S134 is larger than zero, it is assumed that the vehicle 1 is being decelerated at the system-demand deceleration Ds_current under the control by the assist unit 125 at the time point when the driver starts the operation of the brake pedal 112. On the other hand, in the case where the system-demand deceleration Ds_current acquired in step S134 is zero, it is assumed that the vehicle 1 is not being decelerated under the control by the assist unit 125 at the time point when the driver starts the operation of the brake pedal 112.

On the other hand, in the case where the system-demand deceleration Ds_start has been stored as a result of the determination in step S133 (step S133: Yes), the adjustment unit 124 does not perform the above-described process of step S134.

Thereafter, the adjustment unit 124 sets the sum of the current driver-demand deceleration Dd_current acquired from the deceleration calculation unit 123 in step S132 and the system-demand deceleration Ds_start stored in the adjustment unit 124, as the target deceleration D_target (step S135). In the case where the vehicle 1 is not being decelerated under the control by the assist unit 125 at the time point when the driver starts the operation of the brake pedal 112, the system-demand deceleration Ds_start is zero. Therefore, in step S135, the adjustment unit 124 substantially sets the current driver-demand deceleration Dd_current acquired from the deceleration calculation unit 123 in step S132, as the target deceleration D_target.

Figure 4:
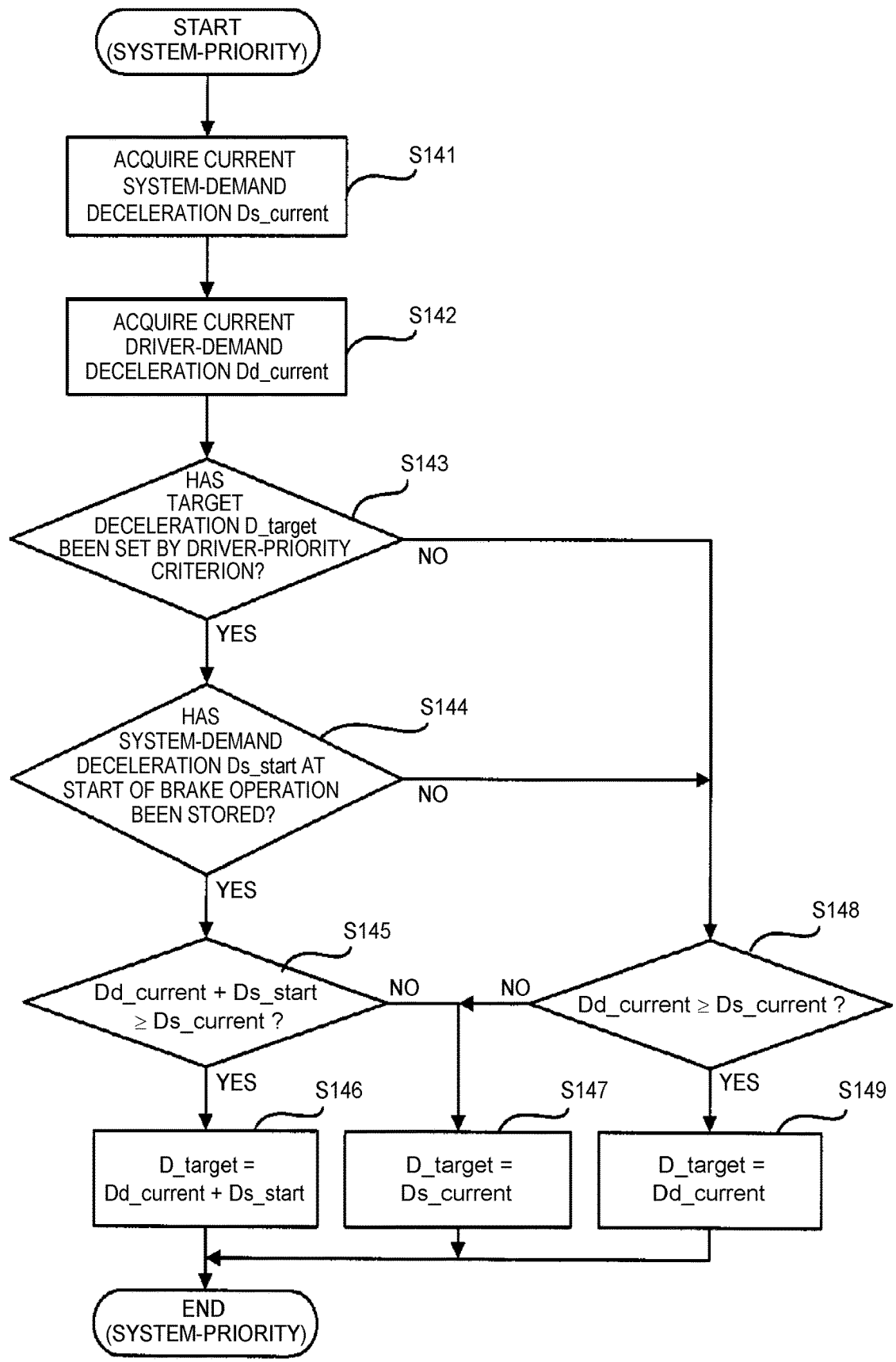
FIG. 4 is a flowchart showing a flow of a behavior for setting the target deceleration in accordance with a system-priority criterion.

Back to FIG. 2, on the other hand, in the case where the adjustment unit 124 determines that the position target has been recognized as a result of the determination in step S12 (step S12: Yes), the deceleration calculation unit 122 is able to decide the target position based on the recognized position target. Therefore, even when the assist unit 125 actively intervenes in the driving of the vehicle 1 based on the decided target position, the position where the decelerating of the vehicle 1 is completed by the intervention does not deviate from the proper definitive target position. Hence, in this case, the adjustment unit 124 sets the target deceleration D_target in accordance with a system-priority criterion in which the active intervention in the driving of the vehicle 1 by the assist unit 125 has priority over the brake operation (step S14). In the following, a behavior for setting the target deceleration D_target in accordance with the system-priority criterion will be further described with reference to FIG. 4. FIG. 4 is a flowchart showing a flow of the behavior for setting the target deceleration D_target in accordance with the system-priority criterion.

As shown in FIG. 4, the adjustment unit 124 acquires the current system-demand deceleration Ds_current from the deceleration calculation unit 122 (step S141). At the stage of step S141, the deceleration calculation unit 122 is able to decide the target position, and therefore, is able to calculate the system-demand deceleration Ds_current based on the decided target position. Furthermore, the adjustment unit 124 acquires the current driver-demand deceleration Dd_current from the deceleration calculation unit 123 (step S142). Furthermore, the adjustment unit 124 determines whether the target deceleration D_target has been already set in accordance with the driver-priority criterion (that is, by the behavior shown in FIG. 3) (step S143). That is, the adjustment unit 124 determines whether the target deceleration D_target has been already set in accordance with the driver-priority criterion, before the target deceleration D_target is set in accordance with the system-priority criterion.

In the case where the adjustment unit 124 determines that the target deceleration D_target has been already set in accordance with the driver-priority criterion as a result of the determination in step S143 (step S143: Yes), the adjustment unit 124 determines whether the system-demand deceleration Ds_start at the time point when the driver started the operation of the brake pedal 112 has been stored (step S144). In the case where the target deceleration D_target has been already set in accordance with the driver-priority criterion, typically, there is a high possibility that the adjustment unit 124 has stored the system-demand deceleration Ds_start. However, in the case where the driver is not operating the brake pedal 112 (step S131 in FIG. 3: No), even when the target deceleration D_target has been already set in accordance with the driver-priority criterion, the adjustment unit 124 has not stored the system-demand deceleration Ds_start yet.

In the case where the adjustment unit 124 determines that the system-demand deceleration Ds_start has been stored as a result of the determination in step S144 (step S144: Yes), it is estimated that the driver operated the brake pedal 112 while the target deceleration D_target was set in accordance with the driver-priority criterion. In this case, the adjustment unit 124 determines whether the sum of the current driver-demand deceleration Dd_current acquired from the deceleration calculation unit 123 in step S142 and the stored system-demand deceleration Ds_start is equal to or larger than the current system-demand deceleration Ds_current acquired from the deceleration calculation unit 122 in step S141 (step S145). In the case where the vehicle 1 is not being decelerated under the control of the assist unit 125 at the time point when the driver starts the operation of the brake pedal 112, the system-demand deceleration Ds_start is zero. Therefore, in step S145, the adjustment unit 124 substantially determines whether the current driver-demand deceleration Dd_current acquired from the deceleration calculation unit 123 in step S142 is equal to or larger than the current system-demand deceleration Ds_current acquired from the deceleration calculation unit 122 in step S141. In the case where the adjustment unit 124 determines that the sum of the driver-demand deceleration Dd_current and the system-demand deceleration Ds_start is equal to or larger than the system-demand deceleration Ds_current as a result of the determination in step S145 (step S145: Yes), the adjustment unit 124 sets the sum of the driver-demand deceleration Dd_current and the system-demand deceleration Ds_start, as the target deceleration D_target (step S146). On the other hand, in the case where the adjustment unit 124 determines that the sum of the driver-demand deceleration Dd current and the system-demand deceleration Ds_start is smaller than the system-demand deceleration Ds_current as a result of the determination in step S145 (step S145: No), the adjustment unit 124 sets the system-demand deceleration Ds_current, as the target deceleration D_target (step S147). That is, the adjustment unit 124 sets the value of a larger one of the sum of the driver-demand deceleration Dd_current and the system-demand deceleration Ds_start and the system-demand deceleration Ds_current, as the target deceleration D_target.

On the other hand, in the case where the adjustment unit 124 determines that the system-demand deceleration Ds_start has not been stored as a result of the determination in step S144 (step S144: No), it is estimated that the driver did not operate the brake pedal 112 while the target deceleration D_target was set in accordance with the driver-priority criterion. In this case, the adjustment unit 124 determines whether the current driver-demand deceleration Dd_current acquired from the deceleration calculation unit 123 in step S142 is equal to or larger than the current system-demand deceleration Ds_current acquired from the deceleration calculation unit 122 in step S141 (step S148). In the case where the adjustment unit 124 determines that the driver-demand deceleration Dd_current is equal to or larger than the system-demand deceleration Ds_current as a result of the determination in step S148 (step S148: Yes), the adjustment unit 124 sets the driver-demand deceleration Dd_current as the target deceleration D_target (step S149). On the other hand, in the case where the adjustment unit 124 determines that the driver-demand deceleration Dd_current is smaller than the system-demand deceleration Ds_current as a result of the determination in step S148 (step S148: No), the adjustment unit 124 sets the system-demand deceleration Ds_current as the target deceleration D_target (step S147). That is, the adjustment unit 124 sets the value of a larger one of the driver-demand deceleration Dd_current and the system-demand deceleration Ds_current, as the target deceleration D_target.

On the other hand, in the case where the adjustment unit 124 determines that the target deceleration D_target has not been set in accordance with the driver-priority criterion as a result of the determination in step S143 (step S143: No), the adjustment unit 124 sets the value of a larger one of the driver-demand deceleration Dd_current and the system-demand deceleration Ds_current, as the target deceleration D_target (step S147 to step S149).

The processes after step S148 are equivalent to the processes after step S145 that are performed while the system-demand deceleration Ds_start is zero. Accordingly, in each of the case where the adjustment unit 124 determines that the target deceleration D_target has not been set in accordance with the driver-priority criterion in step S143 and the case where the adjustment unit 124 determines that the system-demand deceleration Ds_start has not been stored in step S144, the adjustment unit 124 may set the system-demand deceleration Ds_start to zero and then perform the processes after step S145, instead of the processes after the step S148.

Back to FIG. 2, thereafter, the assist unit 125 controls the vehicle 1 (particularly, the brake actuator 13) such that the vehicle 1 is decelerated at the target deceleration D_target calculated by the adjustment unit 124 (step S15). That is, the assist unit 125 controls the brake actuator 13, so as to give, to the vehicle 1, a braking power that allows the vehicle 1 to be decelerated at the calculated target deceleration D_target. As a result, the vehicle 1 is decelerated at the target deceleration D_target.

Thereafter, the assist unit 125 determines whether a predetermined end condition that needs to be satisfied for ending the deceleration assist has been satisfied (step S16). The end condition may include a first condition that the vehicle velocity of the vehicle 1 coincides with the target velocity (that is, the vehicle velocity decreases to the target velocity). The end condition may include a second condition that the vehicle 1 reaches the decided target position (or the provisional target position, in some situations). The end condition may include a third condition that the driver requests the stop of the deceleration assist.

In the case where the assist unit 125 determines that the end condition has been satisfied as a result of the determination in step S16 (step S16: Yes), the ECU 12 ends the deceleration assist. When the deceleration assist is ended, the target deceleration D_target set by the adjustment unit 124 and the system-demand deceleration Ds_start stored in the adjustment unit 124 are reset. On the other hand, in the case where the assist unit 125 determines that the end condition has not been satisfied as a result of the determination in step S16 (step S16: No), the ECU 12 continues the deceleration assist by repeating the processes after step S12.

Specific Example of Deceleration Assist

Figure 5:
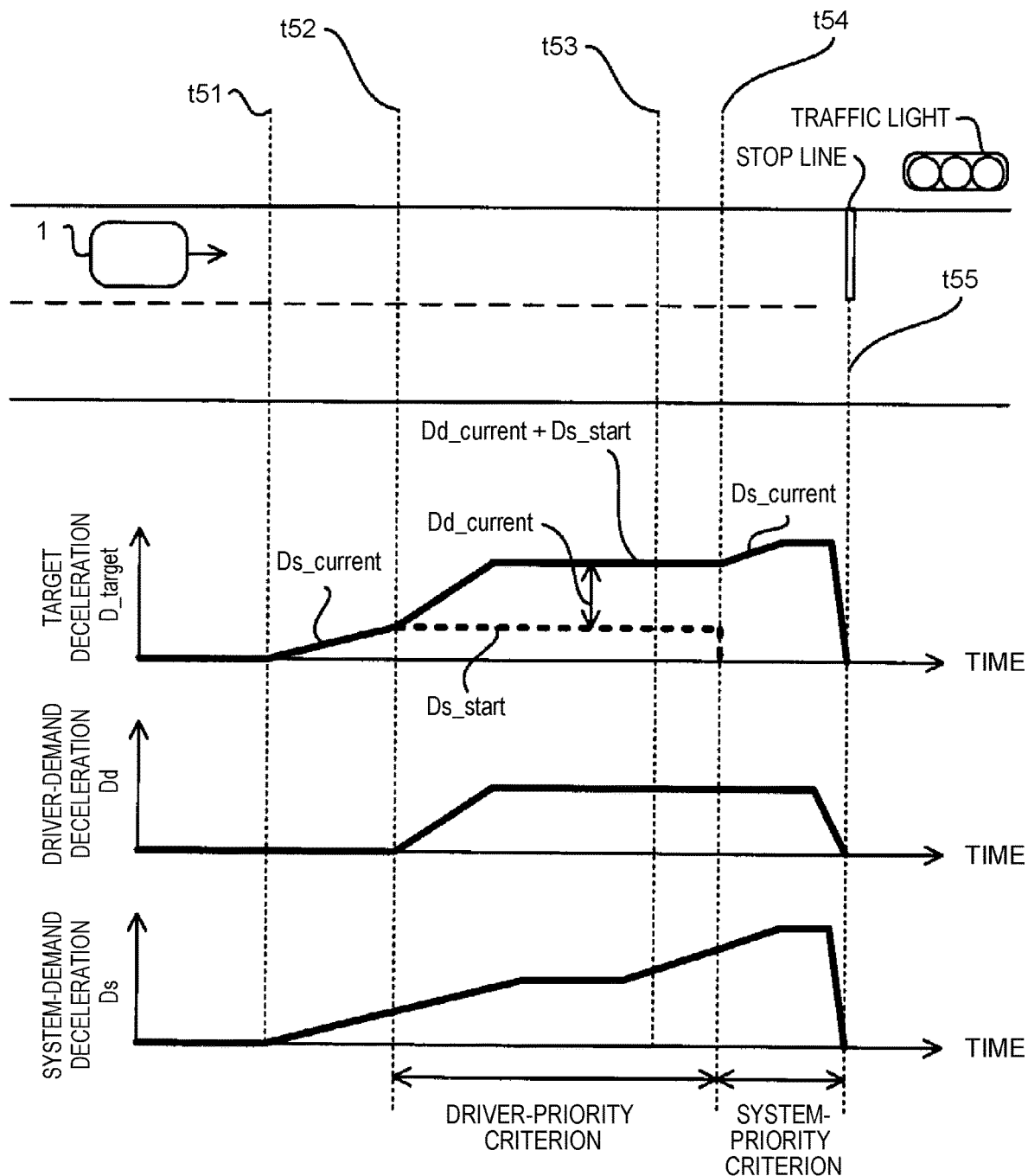
FIG. 5 is a timing chart showing the target deceleration to be set by a deceleration assist that is performed when a vehicle travels toward a stop line with a traffic light, together with a system-demand deceleration and a driver-demand deceleration.

Subsequently, as a specific example of the deceleration assist, a deceleration assist that is performed when the vehicle 1 travels toward a stop line with a traffic light will be described with reference to FIG. 5. FIG. 5 is a timing chart showing the target deceleration D_target to be set by the deceleration assist that is performed when the vehicle 1 travels toward the stop line with the traffic light, together with the system-demand deceleration Ds and the driver-demand deceleration Dd calculated by the deceleration calculation units 122, 123 respectively.

In FIG. 5, at time t51, the image recognition unit 121 recognizes the traffic signal in which the light color is red (that is, a color requiring the stop of the vehicle 1), as the deceleration target. The traffic light is not a position target because the traffic light is not a target indicating a position where the vehicle 1 is required to be stopped. Meanwhile, at time t51, the image recognition unit 121 does not recognize the stop line indicating a position where the vehicle 1 is required to be stopped, as the position target. Therefore, at time t51, the target position is not decided, and therefore, the target deceleration D_target is set in accordance with the driver-demand criterion. Specifically, at time t51, the driver is not operating the brake pedal 112. Therefore, the latest system-demand deceleration Ds calculated by the deceleration calculation unit 122 (that is, the system-demand deceleration Ds_current) is set as the target deceleration D_target.

Thereafter, at time t52, the driver starts the operation of the brake pedal 112. As a result, the system-demand deceleration Ds at time t52 is stored as the system-demand deceleration Ds_start at the time point when the driver starts the operation of the brake pedal 112. As a result, after time t52, the sum of the latest driver-demand deceleration Dd calculated by the deceleration calculation unit 123 (that is, the driver-demand deceleration Dd_current) and the stored system-demand deceleration Ds_start is set as the target deceleration D_target.

Thereafter, at time t53, the image recognition unit 121 recognizes the stop line as the position target. Thereby, at time t53, the target position is decided. Therefore, after time t53, the target deceleration D_target is set in accordance with the system-priority criterion. Specifically, at time t53, the target deceleration D_target has been already set in accordance with the driver-priority criterion, and the system-demand deceleration Ds_start at the time point when the driver started the operation of the brake pedal 112 has been stored. Therefore, after time t53, the value of a larger one of the sum of the latest driver-demand deceleration Dd calculated by the deceleration calculation unit 123 (that is, the driver-demand deceleration Dd_current) and the stored system-demand deceleration Ds_start and the latest system-demand deceleration Ds calculated by the deceleration calculation unit 122 (that is, the system-demand deceleration Ds_current) is set as the target deceleration D_target. Specifically, in a period from time t53 to time t54, the sum of the driver-demand deceleration Dd_current and the system-demand deceleration Ds_start is larger than the system-demand deceleration Ds_current. Therefore, the sum of the driver-demand deceleration Dd_current and the system-demand deceleration Ds_start is set as the target deceleration D_target. After time t54, the sum of the driver-demand deceleration Dd_current and the system-demand deceleration Ds_start is smaller than the system-demand deceleration Ds_current. Therefore, the system-demand deceleration Ds_current is set as the target deceleration D_target.

As a result, at time t55, the vehicle 1 reaches the stop line, and stops.

Technical Effect

As described above, in the embodiment, the ECU 12 can switch the setting method for the target deceleration D_target, based on the result of the determination of whether the position target indicating the position where the decelerating of the vehicle 1 is required to be completed has been recognized (that is, whether the target position where the decelerating of the vehicle 1 is required to be completed is able to be decided). Therefore, the ECU 12 can appropriately perform the deceleration assist by which the vehicle 1 is decelerated to the target velocity before the vehicle 1 reaches the target position, while cooperating with the operation of the brake pedal 112 by the driver.

Specifically, when the target position is not able to be decided, there is a relatively higher possibility that the position where the decelerating of the vehicle 1 is actually completed deviates from the proper target position due to the active intervention in the driving of the vehicle 1 by the deceleration assist, compared to when the target position is able to be decided. Conversely, even when the target position is not able to be decided, there is a relatively lower possibility that the position where the decelerating of the vehicle 1 is actually completed deviates from the proper target position, if the driver appropriately operates the brake pedal 112. Therefore, when the target position is not able to be decided, it is preferable that the operation of the brake pedal 112 by the driver have priority over the active intervention in the driving of the vehicle 1 by the deceleration assist. Hence, in the embodiment, when the target position is not able to be decided, the target deceleration D_target is set in accordance with the driver-priority criterion. As a result, basically, the vehicle 1 is decelerated at the target deceleration D_target that is changed depending on the driver-demand deceleration Dd_current. In consequence, even when the target position is not able to be decided, the vehicle 1 can travel such that the vehicle 1 is decelerated to the target velocity before the vehicle 1 reaches the target position, mainly by the operation of the brake pedal 112 by the driver.

On the other hand, when the target position is able to be decided, there is a relatively lower possibility that the position where the decelerating of the vehicle 1 is actually completed deviates from the proper target position due to the active intervention in the driving of the vehicle 1 by the deceleration assist. Therefore, when the target position is able to be decided, the active intervention in the driving of the vehicle 1 by the deceleration assist may have priority over the operation of the brake pedal 112 by the driver. Hence, in the embodiment, when the target position is able to be decided, the target deceleration D_target is set in accordance with the system-priority criterion. As a result, in principle, the vehicle 1 is decelerated at the target deceleration D_target that is changed depending on the system-demand deceleration Ds_current. In consequence, under the control by the ECU 12, the vehicle 1 can travel such that the vehicle 1 is decelerated to the target velocity before the vehicle 1 reaches the target position.

However, even when the target deceleration D_target is set in accordance with the system-priority criterion, it is estimated that the driver intends to decelerate the vehicle 1 at a larger deceleration than the system-demand deceleration Ds_current, when the system-demand deceleration Ds_current is smaller than the driver-demand deceleration Dd_current (or the sum of the driver-demand deceleration Dd_current and the system-demand deceleration Ds_start). Hence, in this case, the target deceleration D_target that is changed depending on the driver-demand deceleration Dd_current is set. Even in this case, the decelerating of the vehicle 1 is completed before the vehicle 1 reaches the target position, because the target deceleration D_target is larger than the system-demand deceleration Ds_current necessary to decelerate the vehicle 1 to the target velocity before the vehicle 1 reaches the target position.

Furthermore, in the embodiment, in the case where the target deceleration D_target is set in accordance with the driver-priority criterion, the target deceleration D_target is set also in consideration of the system-demand deceleration Ds_start at the time point when the driver starts the operation of the brake pedal 112. As a result, even in the case where the vehicle 1 is already being decelerated by the deceleration assist at the time point when the driver starts the operation of the brake pedal 112, the vehicle 1 can be smoothly decelerated. Specifically, in the case where the vehicle 1 is already being decelerated by the deceleration assist before the driver starts the operation of the brake pedal 112, the target deceleration D_target is supposed to coincide with the system-demand deceleration Ds_current. In this situation, when the target deceleration D_target is switched from the system-demand deceleration Ds_current to the driver-demand deceleration Dd_current at the same time as the start of the operation of the brake pedal 112, there is a possibility that the target deceleration D_target is discontinuously changed. Therefore, for example, there is a possibility that the deceleration of the vehicle 1 drops sharply by an amount equivalent to the deceleration generated due to the deceleration assist. As a result, there is a possibility that the driver feels a shortage of the deceleration and the like (that is, the driver has an uncomfortable feeling). However, in the embodiment, the target deceleration D_target is switched from the system-demand deceleration Ds_current to the sum of the system-demand deceleration Ds_current until that time (that is, the system-demand deceleration Ds_start) and the driver-demand deceleration Dd_current, at the same time as the start of the operation of the brake pedal 112. Therefore, as seen around time t52 in FIG. 5, the target deceleration D_target can be continuously changed. Accordingly, the driver does not have an uncomfortable feeling.

Also in the case where the target deceleration D_target is set in accordance with the system-priority criterion, the target deceleration D_target is set in consideration of the system-demand deceleration Ds_start. The reason is the same as the reason in the case where the target deceleration D_target is set in accordance with the driver-priority criterion.

Modifications

Subsequently, modifications of the deceleration assist will be described.

First Modification of Deceleration Assist

Figure 6:
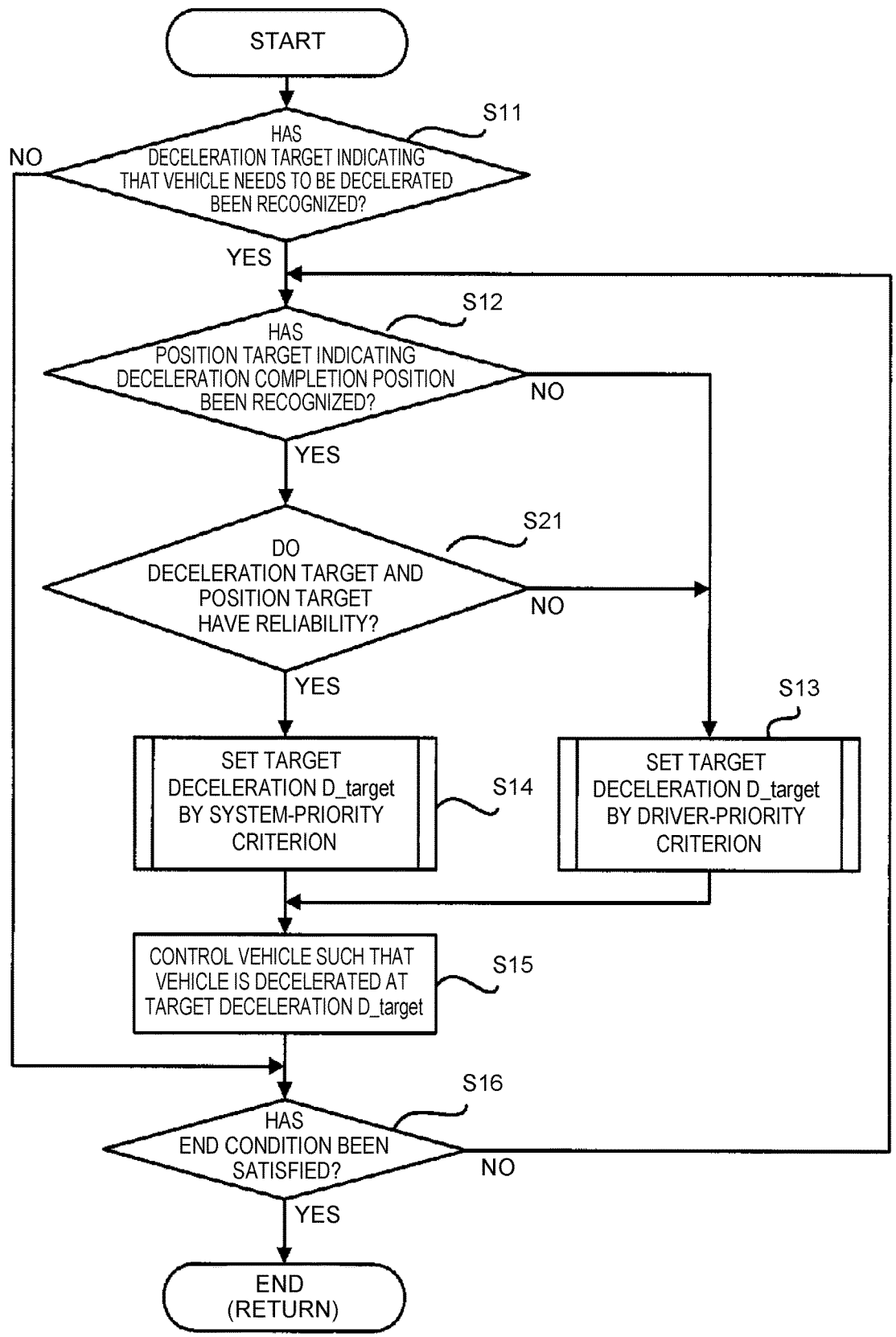
FIG. 6 is a flowchart showing a flow of a first modification of the deceleration assist.

In a first modification, the ECU 12 switches the setting method for the target deceleration Ds_target, based on the result of a determination of whether the deceleration target recognized by the image recognition unit 121 has a reliability that the deceleration target certainly indicates that the vehicle 1 needs to be decelerated and the result of a determination of whether the position target recognized by the image recognition unit 121 has a reliability that the position target appropriately indicates the position where the decelerating of the vehicle 1 is required to be completed, in addition to the result of the determination of whether the target position is able to be decided. In the following, the first modification in which the ECU 12 switches the setting method for the target deceleration Ds_target based on the result of the determination of whether the deceleration target and the position target each have the reliabilities will be described with reference to FIG. 6. FIG. 6 is a flowchart showing a flow of the first modification of the deceleration assist. Here, identical step numbers are assigned to processes identical to the processes described with reference to FIG. 2, and the detailed description will be omitted.

As shown in FIG. 6, the first modification of the deceleration assist is different from the deceleration assist described above with reference to FIG. 2, in that the adjustment unit 124 determines whether the deceleration target and the position target each have the reliabilities (step S21) after the adjustment unit 124 determines that the image recognition unit 121 has recognized the position target (step S12: Yes). Furthermore, the first modification of the deceleration assist is different from the deceleration assist described above with reference to FIG. 2, in that the target deceleration D_target is set in accordance with the driver-priority criterion (step S13) in the case where at least one of the deceleration target and the position target has no reliability (step S21: No) even when the position target has been recognized. On the other hand, in the first modification, in the case where both of the deceleration target and the position target have the reliabilities (step S21: Yes), the target deceleration D_target, as usual, is set in accordance with the system-priority criterion (step S14).

The adjustment unit 124 determines whether the deceleration target has the reliability, based on the recognition result of the image recognition unit 121. Specifically, when the image recognition unit 121 recognizes the deceleration target, the image recognition unit 121 recognizes not only the deceleration target but also the situation around the deceleration target and the situation around the vehicle 1. Examples of the situation around the deceleration target include a sign or the like attached to the deceleration target (for example, an arrow signal light attached to a traffic light), and the setting position of the deceleration target. Examples of the situation around the vehicle 1 include a traveling lane on which the vehicle 1 travels. As a result, in the case of satisfaction of a first non-reliability condition that there is a certain doubt about whether the deceleration target recognized by the image recognition unit 121 certainly indicates that the vehicle 1 equipped with the image recognition unit 121 needs to be decelerated, the adjustment unit 124 determines that the deceleration target has no reliability. On the other hand, in the case of satisfaction of a first reliability condition that there is a sufficient certainty (or there is no certain doubt) about whether the deceleration target recognized by the image recognition unit 121 certainly indicates that the vehicle 1 equipped with the image recognition unit 121 needs to be decelerated, the adjustment unit 124 determines that the deceleration target has the reliability. Alternatively, in the case where the first non-reliability condition is not satisfied, the adjustment unit 124 may determine that the deceleration target has the reliability.

For the position target, similarly, the adjustment unit 124 determines whether the position target has the reliability, based on the recognition result of the image recognition unit 121. As a result, in the case of satisfaction of a second non-reliability condition that there is a certain doubt about whether the position target recognized by the image recognition unit 121 appropriately indicates the position where the decelerating of the vehicle 1 equipped with the image recognition unit 121 is completed, the adjustment unit 124 determines that the position target has no reliability. On the other hand, in the case of satisfaction of a second reliability condition that there is a sufficient certainty (or there is no certain doubt) about whether the position target recognized by the image recognition unit 121 appropriately indicates the position where the decelerating of the vehicle 1 equipped with the image recognition unit 121 is completed, the adjustment unit 124 determines that the position target has the reliability. Alternatively, in the case where the second non-reliability condition is not satisfied, the adjustment unit 124 may determine that the position target has the reliability.

The first non-reliability condition may include a condition that the recognition accuracy of the image recognition unit 121 for the deceleration target is relatively lower. For example, as for a stop line that is an example of the deceleration target, many vehicles pass on the stop line, and accordingly, there is a possibility that a part of the stop line disappears (that is, the stop line wears off). In this case, there is a possibility that the recognition accuracy of the image recognition unit 121 for the stop line is relatively lower although the stop line is contained in the image photographed by the camera 111. Further, it is harder to recognize, on the image, a road sign at a position distant from the vehicle 1, than a road sign at a position close to the vehicle 1. In the case, there is a possibility that the recognition accuracy of the image recognition unit 121 for the road sign is relatively lower although the road sign is contained in the image photographed by the camera 111. In these cases, since the recognition accuracy for the deceleration target is relatively lower, the adjustment unit 124 may determine that the deceleration target has no reliability. For the position target, similarly, the second non-reliability condition may include a condition that the recognition accuracy of the image recognition unit 121 for the position target is relatively lower.

The first non-reliability condition may include a condition that the deceleration target recognized by the image recognition unit 121 does not indicate that the vehicle 1 needs to be decelerated (in other words, the deceleration target recognized by the image recognition unit 121 indicates that another vehicle different from the vehicle 1 needs to be decelerated) in consideration with the situation around the deceleration target and the situation around the vehicle 1. For example, in the case where the image recognition unit 121 has recognized a traffic light set at an intersection that has a complex form (for example, an intersection at which two roads intersects at a sharp angle), there is a possibility that it is not possible to decide whether the traffic light is a traffic light for giving instruction of advance permission and stop about a road on which the vehicle 1 travels or a traffic light for giving instruction of advance permission and stop about another road intersecting the road on which the vehicle 1 travels, only from the recognition result of the image recognition unit 121. In this case, there is a possibility that the deceleration target recognized by the image recognition unit 121 does not indicate that the vehicle 1 needs to be decelerated. Further, the traffic light as the deceleration target sometimes includes an arrow signal light for permitting only the advance of vehicles that travel in a fixed direction. In this case, the traffic light indicates that the vehicle 1 needs to be decelerated only in the case of satisfaction of a condition that an arrow signal permitting the vehicle 1 to advance in an intended advance direction is not displayed, in addition to a condition that the light color of the traffic light is red. Meanwhile, the intended advance direction of the vehicle 1 can be specified from a road mark indicating the advance direction of the vehicle that travels on the traveling lane (for example, a road mark indicating the advance direction as an arrow). Furthermore, such a road mark is information indicating the situation around the vehicle 1, and can be recognized by the image recognition unit 121. However, there is a traveling lane on which travels in a plurality of different advance directions are permitted. Further, there is a traveling lane on which the road mark about the advance direction is not drawn or on which the road mark wears off. In this case, there is a possibility that the intended advance direction of the vehicle 1 is not able to be unambiguously specified. Further, considering that the vehicle 1 can change the traveling lane while the vehicle 1 approaches an intersection, there is a possibility that the intended advance direction of the vehicle 1 is not able to be unambiguously specified, even when the vehicle 1 is some distance away from the intersection. As a result, there is a possibility that it is not possible to decide whether the traffic light recognized by the image recognition unit 121 is a traffic light indicating that the vehicle 1 needs to be decelerated or a traffic light indicating that another vehicle different from the vehicle 1 needs to be decelerated, only from the recognition result of the image recognition unit 121. In these cases, since there is a possibility that the deceleration target recognized by the image recognition unit 121 does not indicate that the vehicle 1 needs to be decelerated, the adjustment unit 124 may determine that the deceleration target has no reliability. For the position target, similarly, the second non-reliability condition may include a condition that the position target recognized by the image recognition unit 121 does not appropriately indicate the position where the decelerating of the vehicle 1 is completed (in other words, the position target recognized by the image recognition unit 121 indicates the position where the decelerating of another vehicle different from the vehicle 1 is completed), in consideration with the situation around the position target and the situation around the vehicle 1.

In the case where the vehicle 1, in addition to the camera 111, includes another detector that can detect the situation in front of (in the advance direction of) the vehicle 1 (particularly, a detector that is different in kind from the camera 111, for example, a radar or a LIDAR), the first non-reliability condition may include a condition that the image recognition unit 121 can recognize the deceleration target from one of the capture result of the camera 111 and the detection result of the detector but cannot recognize the deceleration target from the other of the capture result of the camera 111 and the detection result of the detector. The same goes for the position target.

In the case where the deceleration target is a preceding vehicle, the first non-reliability condition may include a condition that the preceding vehicle is moving. That is, in the case where the deceleration target is a preceding vehicle, the first reliability condition may include a condition that the preceding vehicle is in a stop state. The same goes for the position target.

In the above-described first modification, the ECU 12 can more appropriately perform the deceleration assist by which the vehicle 1 is decelerated to the target velocity before the vehicle 1 reaches the target position, while cooperating with the operation of the brake pedal 112 by the driver. Specifically, when at least one of the deceleration target and the position target has no reliability, there is a higher possibility that the target position supposed to be decided based on the position target deviates from the proper target position, compared to when both of the deceleration target and the position target have the reliabilities. As a result, there is a relatively higher possibility that the position where the decelerating of the vehicle 1 is actually completed deviates from the proper target position due to the active intervention in the driving of the vehicle 1 by the deceleration assist. Conversely, even when at least one of the deceleration target and the position target has no reliability, there is a relatively lower possibility that the position where the decelerating of the vehicle 1 is actually completed deviates from the proper target position, if the driver appropriately operates the brake pedal 112. Therefore, when at least one of the deceleration target and the position target has no reliability, it is preferable that the operation of the brake pedal 112 by the driver have priority over the active intervention in the driving of the vehicle 1 by the deceleration assist, even when the target position is able to be decided. Hence, in the first modification, when at least one of the deceleration target and the position target has no reliability, the target deceleration D_target is set in accordance with the driver-priority criterion. In consequence, even when at least one of the deceleration target and the position target has no reliability, the vehicle 1 can travel such that the vehicle 1 is decelerated to the target velocity before the vehicle 1 reaches the target position, mainly by the operation of the brake pedal 112 by the driver.

Second Modification

Figure 7:
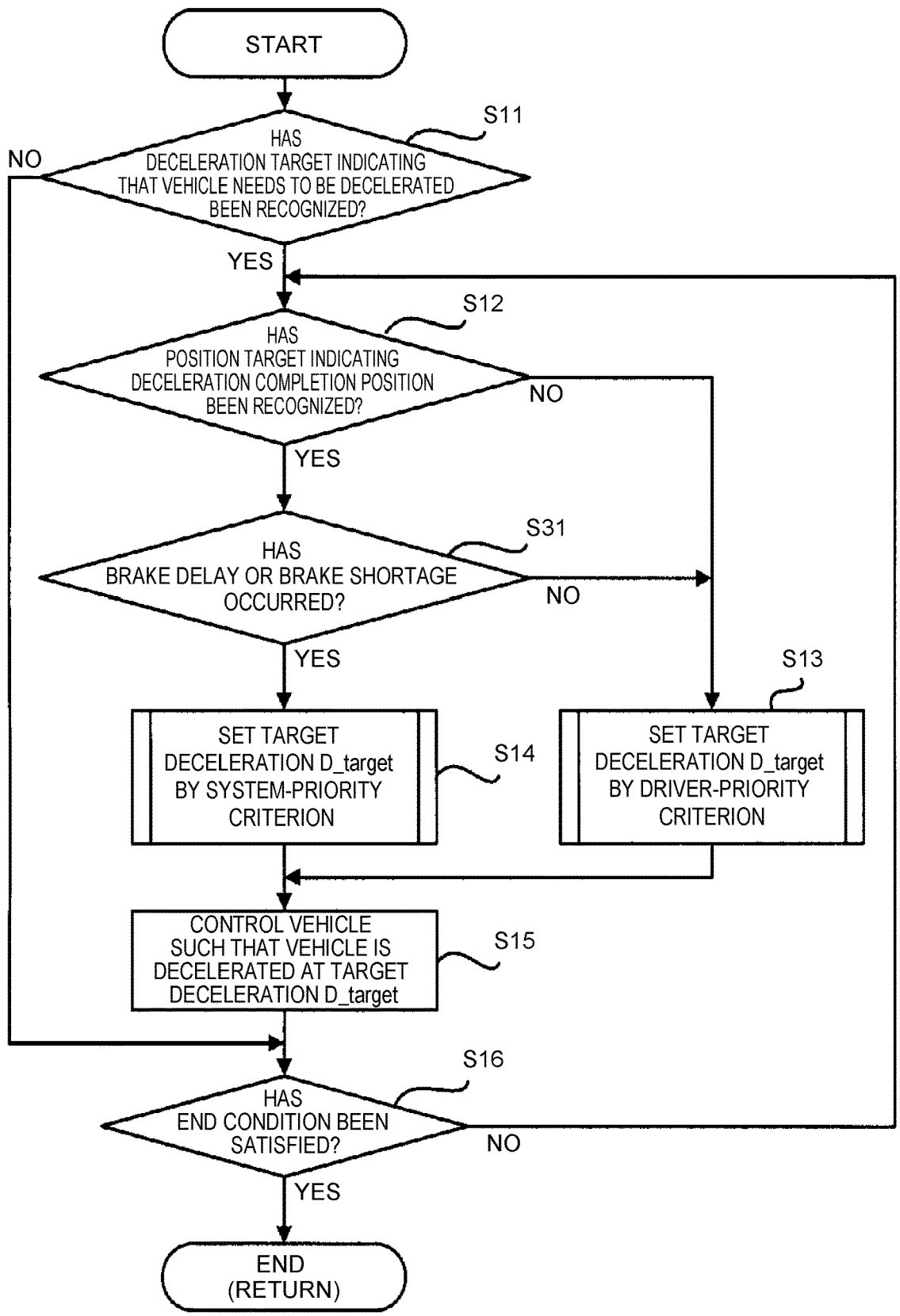
FIG. 7 is a flowchart showing a flow of a second modification of the deceleration assist.

In a second modification, the ECU 12 switches the setting method for the target deceleration Ds_target, based on the result of a determination of whether at least one of a delay and a shortage of the operation of the brake pedal 112 by the driver (hereinafter, referred to as a "brake delay or brake shortage" when appropriate) has occurred, in addition to the result of the determination of whether the target position is able to be decided. The brake delay or brake shortage means that there is a delay or shortage of the operation content of the brake pedal 112 by the driver relative to the operation content of the brake pedal 112 necessary to decelerate the vehicle 1 to the target velocity before the vehicle 1 reaches the target position. In the following, the second modification in which the ECU 12 switches the setting method for the target deceleration Ds_target based on the result of the determination of whether the brake delay or brake shortage has occurred will be described with reference to FIG. 7. FIG. 7 is a flowchart showing a flow of the second modification of the deceleration assist. Here, identical step numbers are assigned to processes identical to the processes described with reference to FIG. 2, and the detailed description will be omitted.

As shown in FIG. 7, the second modification of the deceleration assist is different from the deceleration assist described above with reference to FIG. 2, in that the adjustment unit 124 determines whether the brake delay or brake shortage has occurred (step S31) after the adjustment unit 124 determines that the image recognition unit 121 has recognized the position target (step S12: Yes). Furthermore, the second modification of the deceleration assist is different from the deceleration assist described above with reference to FIG. 2, in that the target deceleration D_target is set in accordance with the driver-priority criterion (step S13) in the case where the adjustment unit 124 determines that the brake delay and brake shortage have not occurred (step S31: No) even when the position target has been recognized. On the other hand, in the second modification, in the case where the adjustment unit 124 determines that the brake delay or brake shortage has occurred (step S31: Yes), the target deceleration D_target, as usual, is set in accordance with the system-priority criterion (step S14).

The adjustment unit 124 determines that the brake delay or brake shortage has occurred, in the case where it is necessary to give a relatively higher braking power (specifically, a higher braking power than a predetermined braking threshold) to the vehicle 1 for decelerating the vehicle 1 to the target velocity before the vehicle 1 reaches the target position. Examples of the determination process in step S31 will be described below.

Figure 8:
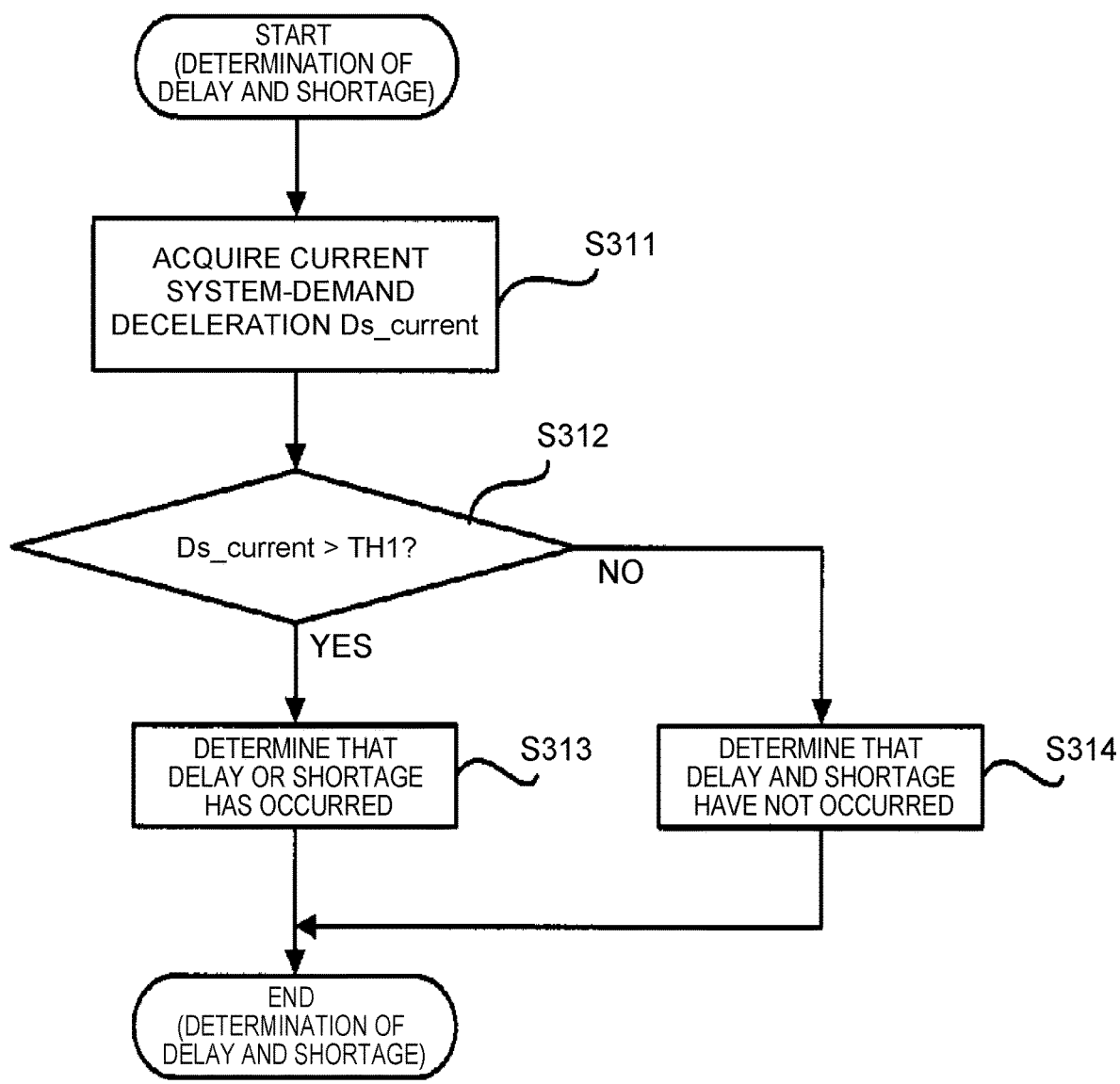
FIG. 8 is a flowchart showing a flow of a first example of a process of determining whether a brake delay or brake shortage has occurred.

The adjustment unit 124 may determine whether the brake delay or brake shortage has occurred, based on the magnitude of the system-demand deceleration Ds_current. In this case, as shown in FIG. 8, the adjustment unit 124 acquires the current system-demand deceleration Ds_current from the deceleration calculation unit 122 (step S311). Thereafter, the adjustment unit 124 determines whether the system-demand deceleration Ds_current acquired in step S311 is larger than a predetermined threshold TH1 (step S312). The predetermined threshold TH1 is set for distinguishing, from a deceleration, between a state where it is necessary to give a relatively higher braking power to the vehicle 1 for decelerating the vehicle 1 to the target velocity before the vehicle 1 reaches the target position and a state where it is only necessary to give a relatively lower braking power to the vehicle 1 for decelerating the vehicle 1 to the target velocity before the vehicle 1 reaches the target position. Typically, the predetermined threshold TH1 is a deceleration that is generated in the vehicle 1 when a braking power corresponding to the above braking threshold is given to the vehicle 1. In the case where the adjustment unit 124 determines that the system-demand deceleration Ds_current is larger than the predetermined threshold TH1 as a result of the determination in step S312 (step S312: Yes), it is estimated that a relatively higher braking power needs to be given to the vehicle 1 for decelerating the vehicle 1 to the target velocity before the vehicle 1 reaches the target position. Therefore, in this case, the adjustment unit 124 determines that the brake delay or brake shortage has occurred (step S313). On the other hand, in the case where the system-demand deceleration Ds_current is not larger than the predetermined threshold TH1 as a result of the determination in step S312 (step S312: No), it is estimated that a relatively higher braking power does not need to be given to the vehicle 1 for decelerating the vehicle 1 to the target velocity before the vehicle 1 reaches the target position. Therefore, in this case, the adjustment unit 124 determines that the brake delay and brake shortage have not occurred (step S314).

Further, an alternative parameter different from the deceleration also allows the distinction between the state where it is necessary to give a relatively higher braking power to the vehicle 1 for decelerating the vehicle 1 to the target velocity before the vehicle 1 reaches the target position and the state where it is only necessary to give a relatively lower braking power to the vehicle 1 for decelerating the vehicle 1 to the target velocity before the vehicle 1 reaches the target position. In this case, instead of the system-demand deceleration Ds_current, the adjustment unit 124 may determine whether the alternative parameter is larger than a predetermined threshold TH2. Examples of the alternative parameter include a time required for the vehicle 1 to reach the target position. In the case where the deceleration target is a preceding vehicle, the time is equivalent to a so-called Time to Collision (TTC).

Figure 9:
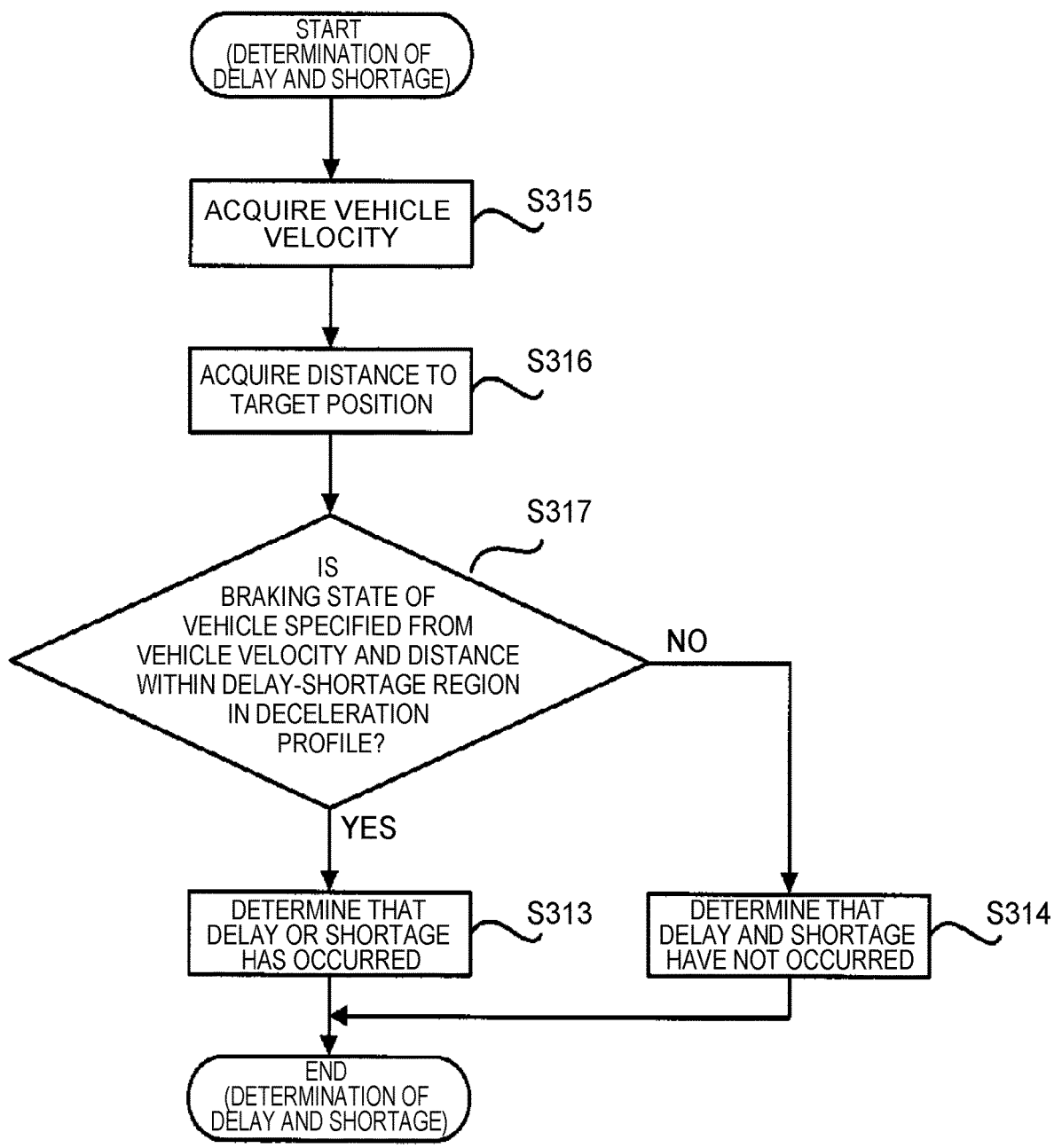
FIG. 9 is a flowchart showing a flow of a second example of the process of determining whether the brake delay or brake shortage has occurred.

Alternatively, the adjustment unit 124 may determine whether the brake delay or brake shortage has occurred, based on the comparison between the operation content of the brake pedal 112 by a general driver and the actual operation content of the brake pedal 112 by the driver. In this case, as shown in FIG. 9, the adjustment unit 124 acquires the vehicle velocity of the vehicle 1 from an unillustrated speed sensor (step S315). Furthermore, the adjustment unit 124 acquires the distance from the vehicle 1 to the target position (step S316). Thereafter, the adjustment unit 124 determines whether the braking state of the vehicle 1 specified from the vehicle velocity acquired in step S315 and the distance acquired in step S316 is within a delay-shortage region in which it is estimated that the brake delay or brake shortage has occurred, on a determination map (see FIG. 10) specified from a deceleration profile that defines a relation between the vehicle velocity and the distance to the target position when the general driver operates the brake pedal 112 so as to decelerate the vehicle 1 to the target velocity before the vehicle 1 reaches the target position (step S317). In the case where the adjustment unit 124 determines that the braking state of the vehicle 1 is within the delay-shortage region as a result of the determination in step S317 (step S317: Yes), the adjustment unit 124 determines that the brake delay or brake shortage has occurred (step S313). On the other hand, in the case where the adjustment unit 124 determines that the braking state of the vehicle 1 is not within the delay-shortage region as a result of the determination in step S312 (step S312: No), the adjustment unit 124 determines that the brake delay or brake shortage has not occurred (step S314).

Figure 10:
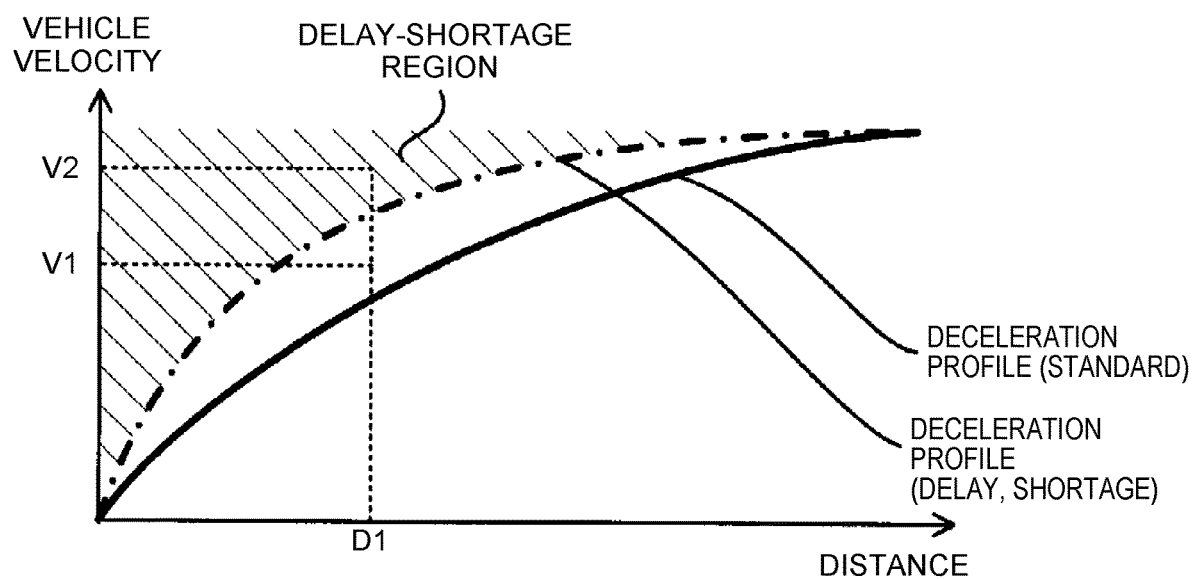
FIG. 10 is a determination map that is used in the second example of the process of determining whether the brake delay or brake shortage has occurred.

As shown in FIG. 10, the determination map is a map in which the vehicle velocity of the vehicle 1 is set as the ordinate axis and the distance to the target position is set as the abscissa axis. Furthermore, FIG. 10 shows a deceleration profile (standard) indicating a relation between the vehicle velocity and distance when the general driver operates the brake pedal 112 so as to decelerate the vehicle 1 to the target velocity before the vehicle 1 reaches the target position, on the determination map. Furthermore, FIG. 10 shows a deceleration profile (delay, shortage) indicating a relation between the vehicle velocity and distance when the driver operates the brake pedal 112 so as to give a relatively higher braking power to the vehicle 1 for decelerating the vehicle 1 to the target velocity before the vehicle 1 reaches the target position because the brake delay or brake shortage has occurred, on the determination map. The delay-shortage region corresponds to a region on the determination map in which the brake delay or brake shortage is further greater than that on the deceleration profile (delay, shortage). For example, in the case where the vehicle velocity acquired in step S315 is V1 and the distance acquired in step S316 is D1 in the example shown in FIG. 10, the adjustment unit 124 determines that the brake delay and brake shortage have not occurred. On the other hand, for example, in the case where the vehicle velocity acquired in step S315 is V2 (V2>V1) and the distance acquired in step S316 is D1 in the example shown in FIG. 10, the adjustment unit 124 determines that the brake delay or brake shortage has occurred.

In the above-described second modification, the ECU 12 can more appropriately perform the deceleration assist by which the vehicle 1 is decelerated to the target velocity before the vehicle 1 reaches the target position, while cooperating with the operation of the brake pedal 112 by the driver. Specifically, when the brake delay and brake shortage have not occurred, it is expected that the vehicle 1 can be decelerated to the target velocity before the vehicle 1 reaches the target position by the operation of the brake pedal 112 by the driver without the active intervention in the driving of the vehicle 1 by the deceleration assist. Therefore, when the brake delay and brake shortage have not occurred, the operation of the brake pedal 112 by the driver may have priority over the active intervention in the driving of the vehicle 1 by the deceleration assist. Hence, in the second modification, when the brake delay and brake shortage have not occurred, the target deceleration D_target is set in accordance with the driver-priority criterion. As a result, it is possible to reduce opportunities for the active intervention in the driving of the vehicle 1 by the deceleration assist.

Also in the second modification, the adjustment unit 124 may determine whether both of the deceleration target and the position target have the reliabilities, as described in the first modification. That is, the second modification may be combined with the first modification.

Other Modifications

Figure 11:
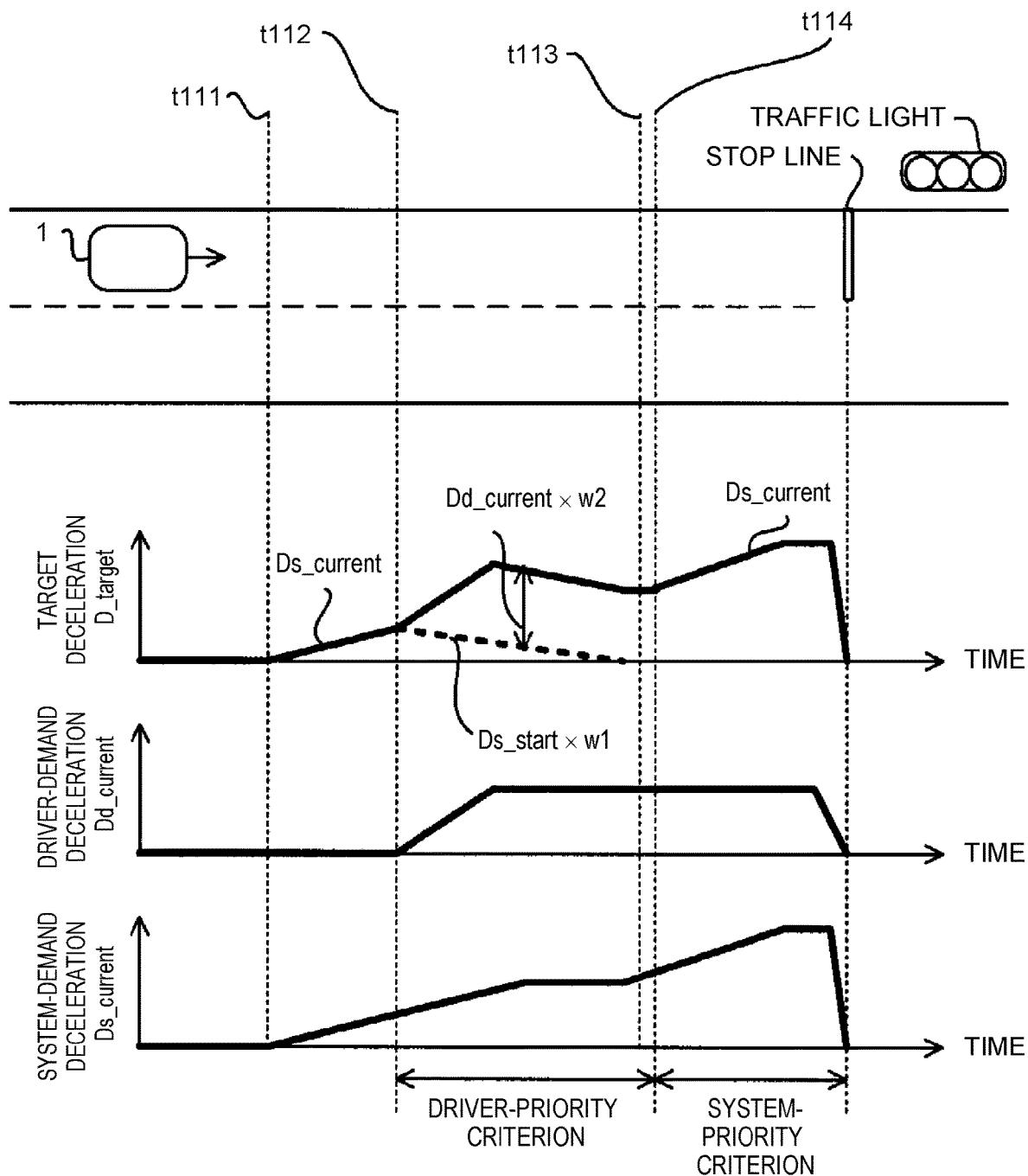
FIG. 11 is a timing chart showing another example of the target deceleration to be set by the deceleration assist that is performed when the vehicle travels toward the stop line with the traffic light, together with the system-demand deceleration and the driver-demand deceleration.

In the above description, when the target deceleration D_target is set in accordance with the driver-priority criterion, the adjustment unit 124 sets the sum of the system-demand deceleration Ds_start and the driver-demand deceleration Dd_current, as the target deceleration D_target, in the case where the vehicle 1 is already being decelerated by the deceleration assist at the time point when the driver starts the operation of the brake pedal 112. However, as the target deceleration D_target, the adjustment unit 124 may set the sum of a value resulting from multiplying the system-demand deceleration Ds_start by a first weighting coefficient w1 and a value resulting from multiplying the driver-demand deceleration Dd_current by a second weighting coefficient w2. Furthermore, in this case, the adjustment unit 124 may adjust at least one of the first weighting coefficient w1 and the second weighting coefficient w2. For example, the adjustment unit 124 may adjust the first weighting coefficient w1 such that the first weighting coefficient w1 gradually decreases. In this case, as shown in FIG. 11, the contribution ratio of a deceleration component based on the system-demand deceleration Ds_start to the target deceleration D_target gradually decreases. As a result, it is possible to set the target deceleration D_target, while further giving priority to the operation of the brake pedal 112 by the driver. However, even in this case, it is preferable that the target deceleration D_target at the time point when the driver starts the operation of the brake pedal 112 be the sum of the system-demand deceleration Ds_start and the driver-demand deceleration Dd_current, for preventing the target deceleration D_target from being discontinuously changed around the time point when the driver starts the operation of the brake pedal 112. That is, it is preferable that at least the first weighting coefficient w1 be 1 at the time point when the driver starts the operation of the brake pedal 112 by the driver.

In the above description, the deceleration target and the position target are recognized from the image showing the situation in front of the vehicle 1 captured by the camera 111. However, the deceleration target and the position target may be recognized by another method. For example, the deceleration target and the position target may be recognized from a detection result of a radar or a LIDAR.

The disclosure can be appropriately altered without departing from the spirit or idea of the disclosure that can be understood from the whole of the claims and the specification, and driving assist devices with such alterations are also included in the technical idea of the disclosure.

What is claimed is:
1. A driving assist device comprising
an electronic control unit configured to perform a deceleration assist, the deceleration assist being a deceleration assist by which a vehicle is decelerated to a target velocity before the vehicle reaches a target position,
the electronic control unit being configured to recognize a situation in front of the vehicle,
the electronic control unit being configured to determine whether the target position is able to be decided from a predetermined object, when the electronic control unit recognizes that the predetermined object exists in front of the vehicle, the predetermined object indicating that the vehicle needs to be decelerated, the electronic control unit being configured to perform a first assist as the deceleration assist when the electronic control unit determines that the target position is not able to be decided, the first assist being an assist by which the vehicle is decelerated at a first deceleration, the first deceleration being changed based on a brake operation by a driver, and the electronic control unit being configured to perform a second assist as the deceleration assist when the electronic control unit determines that the target position is able to be decided, the second assist being an assist by which the vehicle is decelerated at a second deceleration, the second deceleration being equal to or higher than a predetermined deceleration necessary to decelerate the vehicle to the target velocity before the vehicle reaches the target position decided from the predetermined object.

2. The driving assist device according to claim 1, wherein an initial value of the first deceleration is a sum of a deceleration that is demanded by the brake operation at a time point of start of the brake operation and a deceleration that is generated in the vehicle at the time point due to the deceleration assist.

3. The driving assist device according to claim 1, wherein the second deceleration at a predetermined time point in a period in which the second assist is performed is a larger one of the predetermined deceleration at the predetermined time point, and a sum of a deceleration that is demanded by the brake operation at the predetermined time point and a deceleration that is generated in the vehicle at a time point of start of the brake operation due to the deceleration assist.

4. The driving assist device according to claim 1, wherein the electronic control unit is configured to determine that the target position is able to be decided, when the electronic control unit recognizes a position where decelerating of the vehicle is required to be completed and recognizes a first object as the predetermined object, the first object indicating that the vehicle needs to be decelerated, the electronic control unit is configured to determine that the target position is not able to be decided, when the electronic control unit recognizes a second object as the predetermined object and does not recognize the first object as the predetermined object, the second object being different from the first object.

5. The driving assist device according to claim 1, wherein the electronic control unit is configured to determine whether the recognized predetermined object has a first reliability, based on a recognition result of the predetermined object, the first reliability being a reliability that the predetermined object certainly indicates that the vehicle needs to be decelerated, the electronic control unit is configured to perform the first assist as the deceleration assist, when the electronic control unit determines that the target position is able to be decided and determines that the predetermined object does not have the first reliability, and the electronic control unit is configured to perform the second assist as the deceleration assist, when the electronic control unit determines that the target position is able to be decided and determines that the predetermined object has the first reliability.

6. The driving assist device according to claim 1, wherein the predetermined object includes a first object indicating a position where decelerating of the vehicle is required to be completed, the electronic control unit is configured to determine whether the first object recognized as the predetermined object has a second reliability, based on a recognition result of the predetermined object, the second reliability being a reliability that the first object appropriately indicates the position where the decelerating of the vehicle is required to be completed, the electronic control unit is configured to perform the first assist as the deceleration assist, when the electronic control unit determines that the target position is able to be decided and determines that the first object does not have the second reliability, and the electronic control unit is configured to perform the second assist as the deceleration assist, when the electronic control unit determines that the target position is able to be decided and determines that the first object has the second reliability.

7. The driving assist device according to claim 1, wherein the electronic control unit is configured to determine whether at least one of a delay and a shortage of an actual brake operation has occurred relative to a virtual brake operation necessary to decelerate the vehicle to the target velocity before the vehicle reaches the target position, the electronic control unit is configured to perform the first assist as the deceleration assist, when the electronic control unit determines that the target position is able to be decided and determines that neither of the delay and the shortage of the actual brake operation has occurred, and the electronic control unit is configured to perform the second assist as the deceleration assist, when the electronic control unit determines that the target position is able to be decided and determines that the at least one of the delay and the shortage of the actual brake operation has occurred.

8. The driving assist device according to claim 1, wherein the vehicle includes a detector configured to detect the situation in front of the vehicle, and the electronic control unit is configured to recognize the situation in front of the vehicle based on a detection result of the detector.

9. A driving assist method for a vehicle that includes an electronic control unit and a detector, the electronic control unit being configured to perform a deceleration assist, the deceleration assist being a deceleration assist by which a vehicle is decelerated to a target velocity before the vehicle reaches a target position, the detector being configured to detect a situation in front of the vehicle, the driving assist method comprising:

recognizing, by the electronic control unit, the situation in front of the vehicle based on a detection result of the detector;

determining, by the electronic control unit, whether the target position is able to be decided from a predetermined object, when the electronic control unit recognizes that the predetermined object exists in front of the vehicle, the predetermined object indicating that the vehicle needs to be decelerated;

performing, by the electronic control unit, a first assist as the deceleration assist when the electronic control unit determines that the target position is not able to be decided, the first assist being an assist by which the vehicle is decelerated at a first deceleration, the first deceleration being changed based on a brake operation by a driver; and performing, by the electronic control unit, a second assist as the deceleration assist when the electronic control unit determines that the target position is able to be decided, the second assist being an assist by which the vehicle is decelerated at a second deceleration, the second deceleration being equal to or higher than a predetermined deceleration necessary to decelerate the vehicle to the target velocity before the vehicle reaches the target position decided from the predetermined object.

* * * * *